(12) United States Patent
Jeong et al.

(10) Patent No.: US 10,802,626 B2
(45) Date of Patent: Oct. 13, 2020

(54) DISPLAY DEVICE INCLUDING A TOUCH MEMBER

(71) Applicant: SAMSUNG DISPLAY CO., LTD., Yongin-si, Gyeonggi-Do (KR)

(72) Inventors: Hwan Hee Jeong, Cheonan-si (KR); Ki Cheol Kim, Yongin-si (KR)

(73) Assignee: SAMSUNG DISPLAY CO., LTD., Yongin-si-Gyeonggi (KR)

( * ) Notice: Subject to any disclaimer, the term of this patent is extended or adjusted under 35 U.S.C. 154(b) by 51 days.

(21) Appl. No.: 16/190,973

(22) Filed: Nov. 14, 2018

(65) Prior Publication Data

US 2019/0377445 A1  Dec. 12, 2019

(30) Foreign Application Priority Data

Jun. 8, 2018 (KR) .................. 10-2018-0066417

(51) Int. Cl.
  *G06F 3/041* (2006.01)
  *G06F 1/3234* (2019.01)
  *G06F 3/047* (2006.01)

(52) U.S. Cl.
  CPC .......... *G06F 3/0412* (2013.01); *G06F 1/3262* (2013.01); *G06F 3/047* (2013.01)

(58) Field of Classification Search
  None
  See application file for complete search history.

(56) References Cited

U.S. PATENT DOCUMENTS

| | | | |
|---|---|---|---|
| 2015/0205418 A1* | 7/2015 | Nam | G06F 3/044 345/174 |
| 2017/0062760 A1* | 3/2017 | Kim | H01L 51/0097 |
| 2019/0179449 A1* | 6/2019 | Cho | G06F 3/04164 |

FOREIGN PATENT DOCUMENTS

KR  20130118072  10/2013

* cited by examiner

*Primary Examiner* — Christopher J Kohlman
(74) *Attorney, Agent, or Firm* — F. Chau & Associates, LLC

(57) ABSTRACT

A display device includes a first region including a display area. A second region of the display device includes a pad unit. A bending region is disposed between the first region and the second region. A plurality of signal wirings extends from the second region to the first region and crosses through the bending region. The plurality of signal wirings includes a plurality of touch signal wirings and a first power supply wiring. The plurality of touch signal wirings at least partially overlaps the first power supply wiring in the first region.

30 Claims, 18 Drawing Sheets

160 : 161, 162, 163
140 : 141, 142

US 10,802,626 B2

1

DISPLAY DEVICE INCLUDING A TOUCH MEMBER

This application claims priority to Korean Patent Application No. 10-2018-0066417, filed on Jun. 8, 2018, in the Korean Intellectual Property Office, the disclosure of which is herein incorporated by reference in its entirety.

TECHNICAL FIELD

The present disclosure relates to a display device, and, more particularly, to a display device including a touch member.

DISCUSSION OF THE RELATED ART

A display device is a device used for displaying an image. Display devices are used in various electronic devices, such as smart phones, tablet computers, personal computers (PCs), digital cameras, notebook computers, satellite navigation devices, and televisions. The display device includes a display panel for generating and displaying an image and various other components. For example, various input devices are commonly incorporated into display devices so as to provide a touchscreen display.

Touch screen displays may be used in smart phones and tablet PCs to recognize a touch input of a user's finger or stylus. Touch screen displays may incorporate both a display panel and a touch panel, either as separate elements or as a single structure. The touch panel determines whether or not a touch input has been made, and calculates the corresponding position of the touch input as touch input coordinates. Touch panels may also determine an intensity or pressure of the touch input. The touch panel includes a plurality of touch signal wirings that carry signals used to sense the touch input. When the touch signal wirings of the touch panel overlap the signal wirings of a display area, noise may occur in the touch sensing signals.

SUMMARY

A display device includes a first region including a display area. A second region of the display device includes a pad unit. A bending region is disposed between the first region and the second region. A plurality of signal wirings extends from the second region to the first region and crosses through the bending region. The plurality of signal wirings includes a plurality of touch signal wirings and a first power supply wiring. The plurality of touch signal wirings at least partially overlaps the first power supply wiring in the first region.

A display device includes a substrate having a first region including a display area, a second region including a pad unit, a bending region disposed between the first region and the second region, and a plurality of signal wirings extending from the second region to the first region, and crossing the bending region. A gate conductive layer is disposed on the substrate. A first insulating layer is disposed on the gate conductive layer. A data conductive layer is disposed on the first insulating layer. A second insulating layer is disposed on the data conductive layer. A touch conductive layer is disposed on the second insulating layer. The plurality of signal wirings includes a plurality of touch signal wirings and a first power supply wiring. The first power supply wiring includes the data conductive layer. Each of the plurality of touch signal wirings includes the touch conductive layer in the first region and the second region and further includes the data conductive layer in the bending region. The plurality of touch signal wirings at least partially overlaps the first power supply wiring in the first region.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
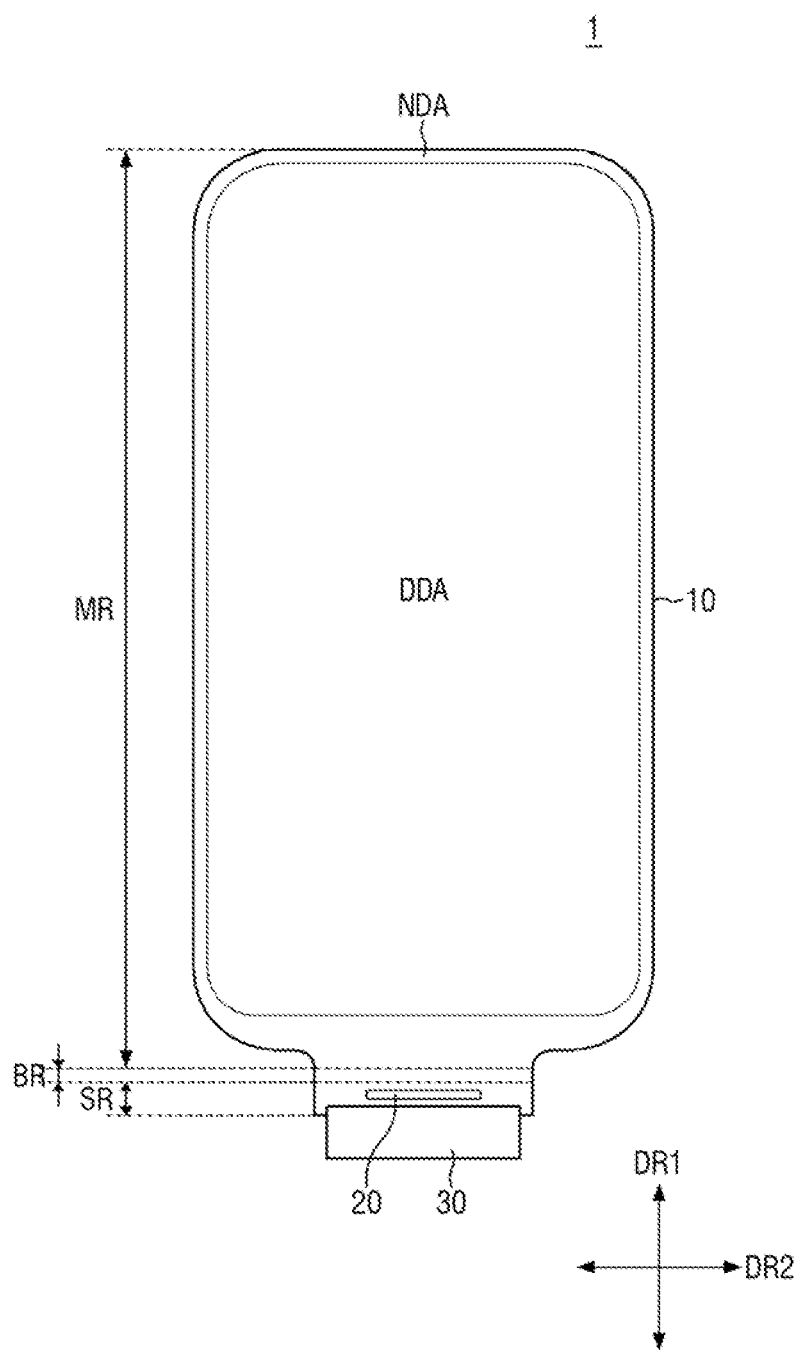
FIG. 1 is a plan view illustrating a display device according to an exemplary embodiment of the present disclosure.

In describing exemplary embodiments of the present disclosure illustrated in the drawings, specific terminology is employed for sake of clarity. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art. Like reference numerals may refer to like elements throughout the specification.

It will be understood that when an element or layer is referred to as being "on", "connected to" or "coupled to" another element or layer, it can be directly on, connected or coupled to the other element or layer or intervening elements or layers may be present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The present invention will be described with reference to perspective views, cross-sectional views, and/or plan views, in which exemplary embodiments of the invention are shown.

Hereinafter, exemplary embodiments of the present invention will be described with reference to the attached drawings.

Figure 2:
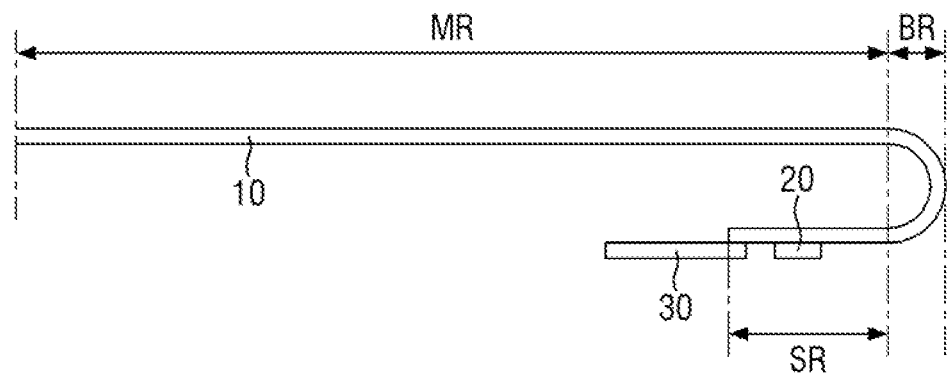
FIG. 2 is a schematic partial cross-sectional view illustrating a display device according to an exemplary embodiment of the present disclosure.

FIG. 1 is a plan view illustrating a display device according to an exemplary embodiment of the present disclosure. FIG. 2 is a schematic partial cross-sectional view illustrating a display device according to an exemplary embodiment of the present disclosure.

According to exemplary embodiments of the present disclosure, the first direction DR1 and the second direction DR2 may cross each other. In the plan view of FIG. 1, for convenience of explanation, the first direction DR1 is defined as a vertical direction, and the second direction DR2 is defined as a horizontal direction. As used herein, in the plan view, one side of the first direction DR1 refers to an upper direction, the other side of the first direction DR 1 refers to a lower direction, one side of the second direction DR2 refers to a right direction, and the other side of the second direction DR2 refers to a left direction. However, it should be understood that the directions referred to in the embodiments are referred to as relative directions, and the embodiments are not limited to the mentioned directions.

Referring to FIGS. 1 and 2, a display device 1 is a device for displaying a moving image or a still image. The display device 1 may be used as a display screen for various products such as televisions, notebook computers, computer monitors, billboards, and Internet of Things (IoT) devices, as well as portable electronic appliances such as mobile phones, smart phones, tablet computers, smart watches, watch phones, mobile communication terminals, electronic notebooks, electronic book (e-book) readers, portable multimedia players (PMPs), satellite navigation devices, and ultra mobile PCS (UMPs). Examples of the display device 1 may include an organic light emitting display device, a liquid crystal display device, a plasma display device, a field emission display device, an electrophoretic display device, an electrowetting display device, a quantum dot emission display device, and a micro LED display device. Hereinafter, the display device 1 will be described with reference to an organic light emitting display device, but the present invention is not limited thereto.

The display device 1 may include a display panel 10. In addition, the display device 1 may include a touch member. The display panel 10 and the touch member may either be separate structures that are attached to each other, or, the display panel 10 and the touch member may be integrally formed as a single structure. In the following disclosure, the touch member is provided inside of the touch panel, but the present invention is not limited thereto.

The display panel 10 may include a flexible substrate including a flexible polymer material such as polyimide. Therefore, the display panel may be warped, bent, folded, or rolled.

The display panel 10 may include a bending region BR where the display panel 10 is bent. The display panel may be divided by the bending area into a first region and a second region. The first region is disposed at one side of the bending region BR, and the second region is disposed at the other side of the bending region BR. The first region may be a main region including a display area DDA. The second region may be a sub region including a pad unit. When the display area DDA is defined as an area displaying an image and the non-display area NDA is defined an area not displaying an image, the display area DDA of the display panel 10 is disposed in the main region MR. The residual area except for the display area DDA is the non-display area NDA of the display panel 10. In an exemplary embodiment of the present disclosure, the non-display area NDA may include the edge portion of the display area DDA in the main region MR, the entire bending region BR, and the entire sub region SR. However, the present invention is not limited thereto, and the bending region BR and/or sub region SR may also be included within the display area DDA.

The main region MR may have a shape substantially similar to the planar outer shape of the display device 1. The main region MR may be a flat region located on a single plane. However, the present invention is not limited thereto. In the main region MR, at least one of the edges other than the edge (side) connected to the bending region BR may be warped to form a curved surface or may be bent down in a vertical direction.

The display area DDA of the display panel 10 may be disposed at the center of the main region MR. The display area DDA may include a plurality of pixels. The touch area of the touch member may at least partially overlap the display area DDA or may be disposed within the display area DDA.

The display area DDA may have a rectangular shape or a substantially rectangular shape having rounded corners. The illustrated display area DDA has a substantially rectangular shape with rounded corners and in which the sides extending in the first direction DR1 are longer than the sides extending in the second direction DR2. However, the present invention is not limited thereto, and the display area DDA may have a rectangular shape in which the sides extending in the second direction DR2 are longer than the sides extending in the first direction DR1, and the display are DDA may have various other shapes such as a square, polygons, a circle, ellipse, etc.

In the main region MR, when at least one of the edges other than the edge (side) connected to the bending region BR forms a curved surface or is bent, the display area DDA may be disposed at the corresponding edge. However, the present invention is not limited thereto. At the curved surface or the bent edge, the non-display area NDA not displaying an image may be disposed, or both the display area DDA and the non-display area NDA may be disposed.

In the main region MR, the non-display area NDA may be located around the display area DDA. The non-display area NDA of the main region MR may be placed in an area defined from the outer boundary of the display area DDA to the edge of the display panel 10. The non-display area NDA of the main region MR may be provided with signal wirings or driving circuits for applying signals to the display area DDA and/or the touch area. Further, the non-display area NDA of the main region MR may be provided with an outermost black matrix, but the present invention is not limited thereto.

The bending region BR is connected to the other side of the main region MR in the first direction DR1. For example, the bending region BR may be connected through the lower short side of the main region MR. The width of the bending region BR may be smaller than the width (width of the short side) of the main region MR. The connection unit between the main region MR and the bending region BR may be substantially L-shaped.

In the bending region BR, the display panel 10 may be bent downwards with a curvature in the thickness direction, for example, in a direction opposite to the direction of display surface. The bending region BR may have a constant radius of curvature, but the present invention is not limited thereto, and the bending region BR may have a different radius of curvature for each section. As the display panel 10 is bent in the bending region BR, the surface of the display panel 10 may be reversed. For example, one side of the display panel 10 facing upward may be changed to face outward through the bending region BR and may then be bent to face downward.

The sub region SR extends from the bending region BR. The sub region SR may extend in a direction parallel to the main region MR, starting from the completion of bending. The sub region SR may at least partially overlap the main region MR in the thickness direction of the display panel 10. The sub region SR may at least partially overlap the non-display area NDA of the edge of the main region MR, and may also at least partially overlap the display area DDA of the main region MR.

The width of the sub region SR may be equal to the width of the bending region BR. However, the present invention is not limited thereto and the width of the sub region SR may be greater than or less than the width of the bending region.

A driving chip 20 may be disposed on the sub region SR of the display panel 10. The driving chip 20 may include an integrated circuit for driving the display panel 10. In an exemplary embodiment of the present disclosure, the integrated circuit may be, but is not limited to being, a display data driving integrated circuit that generates and provides data signals. The driving chip 20 may be mounted on the display panel 10 in the sub region SR. The driving chip 20 is mounted on one surface of the display panel 10, which is the same surface as the display surface, but, as described above, the driving chip 20 may be mounted on the surface of the display panel 10 facing downward in the thickness direction as the bending region BR is bent and inverted, so that the upper surface of the driving chip 20 faces downward.

The driving chip 20 may be attached onto the display panel 10 through an isotropic conductive film, or may be attached onto the display panel 10 by ultrasonic bonding. The width of the driving chip 20 in the horizontal direction (second direction DR2) may be smaller than the width of the display panel 10 in the horizontal direction (second direction DR2). The driving chip 20 may be disposed at the center of the sub region SR in the horizontal direction (second direction DR2), and both side surfaces of the driving chip 20 may be spaced apart from the left and right edges of the sub region SR.

The pad unit may be disposed at the end of the sub region SR of the display panel 10. The pad unit may include a plurality of display signal wiring pads and a plurality of touch signal wiring pads. A driving substrate 30 may be connected to the pad unit of the end of the sub region SR of the display panel 10. The driving substrate 30 may be a flexible printed circuit board or a flexible film. The driving substrate 30 may be an integrated driving substrate 30 that performs both the driving of the display panel 10 and the driving of the touch member. However, the present invention is not limited thereto, and a separate display driving substrate and a separate touch driving substrate may be attached to the sub region SR of the display panel 10.

Figure 3:
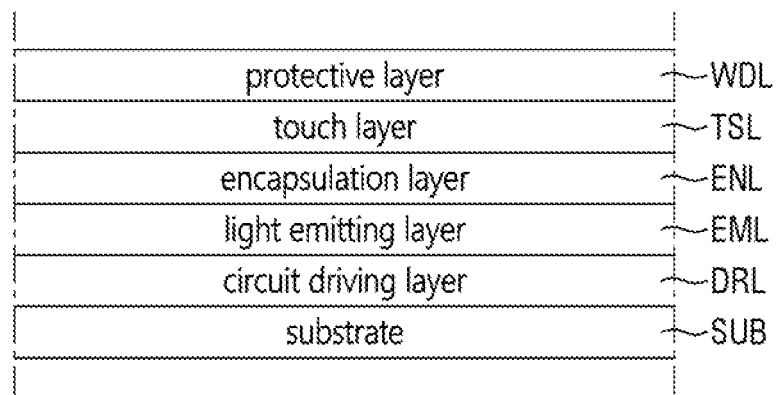
FIG. 3 is a schematic cross-sectional view illustrating an exemplary laminate structure of a display panel according to an exemplary embodiment of the present disclosure.

FIG. 3 is a schematic cross-sectional view illustrating an exemplary laminate structure of a display panel according to an exemplary embodiment of the present disclosure.

Referring to FIG. 3, the display panel 10 may include a substrate SUB and a circuit driving layer DRL disposed on the substrate SUB. The circuit driving layer DRL may include a circuit for driving a light emitting layer EML of a pixel. The circuit driving layer DRL may include a plurality of thin film transistors.

The light emitting layer EML may be disposed on the circuit driving layer DRL. The light emitting layer EML may include an organic light emitting layer. The luminance of the light emitted by the light emitting layer EML may be controlled by a driving signal transmitted from the circuit driving layer DRL.

An encapsulation layer ENL may be disposed on the light emitting layer EML. The encapsulation layer ENL may include an inorganic film or a laminate film of an inorganic film and an organic film. The encapsulation layer ENL may alternatively include a glass layer or an encapsulation film.

A touch layer TSL may be disposed on the encapsulation layer ENL. The touch layer TSL is a layer for recognizing a touch input, and the touch layer may be configured to perform a function of a touch member. The touch layer TSL may include a plurality of sensing areas and a plurality of sensing electrodes.

A protective layer WDL may be disposed on the touch layer TSL. The protective layer WDL may include, for example, a window member. The protective layer WDL may be attached to the touch layer TSL by an optical clear adhesive or the like.

The display panel 10 may further include an optical member. For example, an optical member such as a polarization film may be interposed between the touch layer TSL and the protective layer WDL.

Hereinafter, the aforementioned touch member will be described in more detail.

Figure 4:
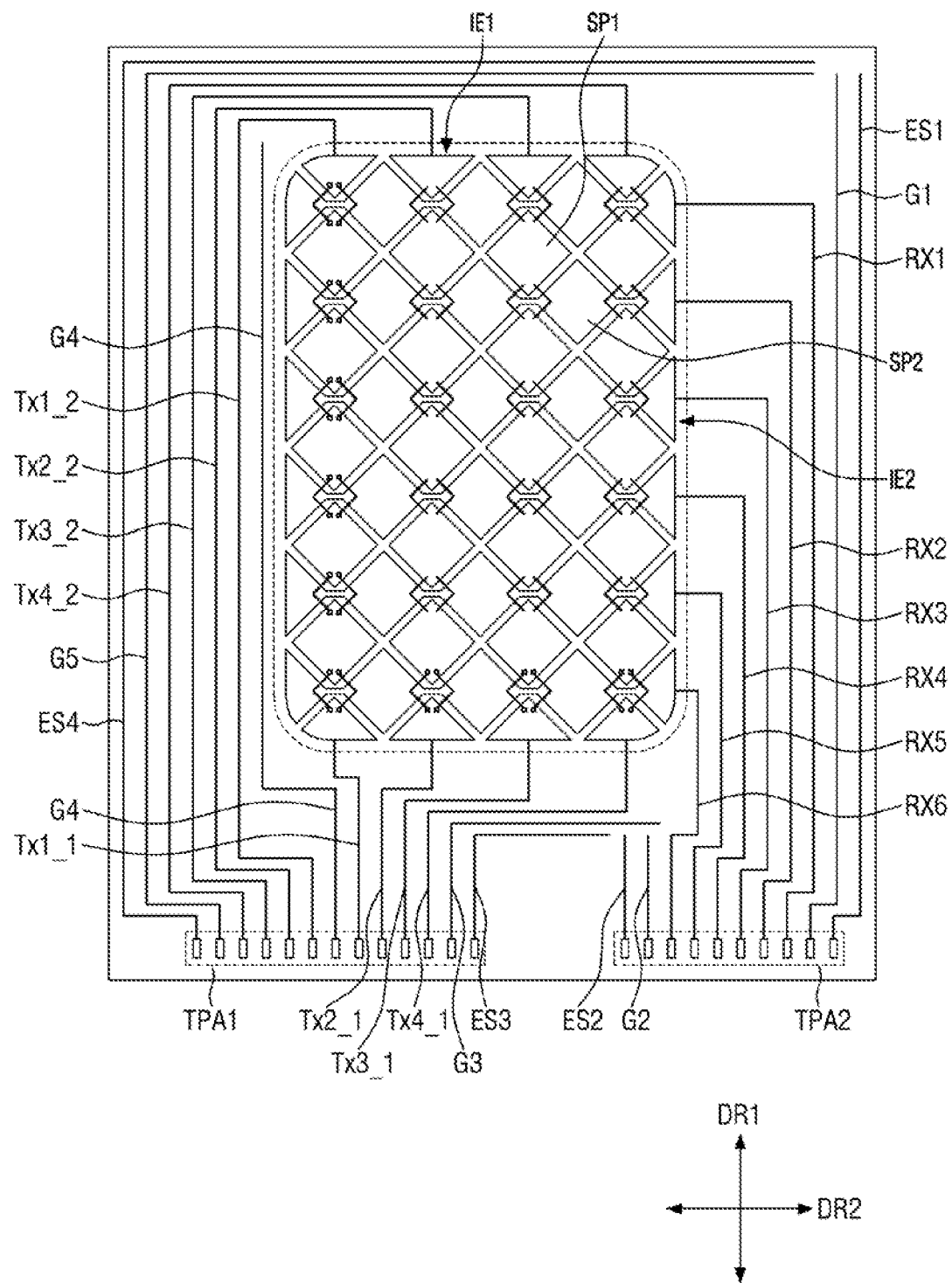
FIG. 4 is a plan view illustrating a touch member according to an exemplary embodiment of the present disclosure.

FIG. 4 is a plan view illustrating a touch member according to an exemplary embodiment of the present disclosure.

Referring to FIG. 4, the touch member includes a touch area as an active area and a non-touch area as an inactive area. The touch area may at least partially overlap the aforementioned display area DDA, and the non-touch area may at least partially overlap the aforementioned non-display area NDA. For convenience of explanation, although the overall shape of the touch member is simplified in FIG. 4 and the non-touch area is shown as being relatively broad, the shape of the touch area and the shape of the non-touch area may be substantially the same as those of the display area DDA and the non-display area NDA described above, respectively. Hereinafter, the non-touch area will be referred to as a non-display area NDA except in a case where it is necessary to separately distinguish the non-touch area from the non-display area NDA.

The touch area of the touch member may include a plurality of first sensing electrodes IE1 (or first touch electrodes) and a plurality of second sensing electrodes IE2 (or second touch electrodes). Any one of the first sensing electrode IE1 and the second sensing electrode IE2 may be a driving electrode, and the other thereof may be a sensing electrode. According to an exemplary embodiment of the present disclosure, the first sensing electrode IE1 is a driving electrode and the second sensing electrode IE2 is a sensing electrode. However, other configurations may be used.

The first sensing electrode IE1 may extend in the first direction DR1. The first sensing electrode IE1 may include a plurality of first sensor units SP1 arranged in the first direction DR1 and a first connection unit CP1 electrically connecting the adjacent first sensor units SP1. The plurality of first sensing electrodes IE1 may be arranged in the second direction DR2.

The second sensing electrode IE2 may extend in the second direction DR2. The second sensing electrode IE2 may include a plurality of second sensor units SP2 arranged in the second direction DR2 and a second connection unit CP2 electrically connecting the adjacent second sensor units SP2. The plurality of second sensing electrodes IE2 may be arranged in the first direction DR1.

Although it is shown in the drawing that four first sensing electrodes IE1 and six second sensing electrodes IE2 are arranged, the present invention is not limited thereto and there may be any number of first sensing electrodes IE1 and second sensing electrodes IE2.

Figure 5:
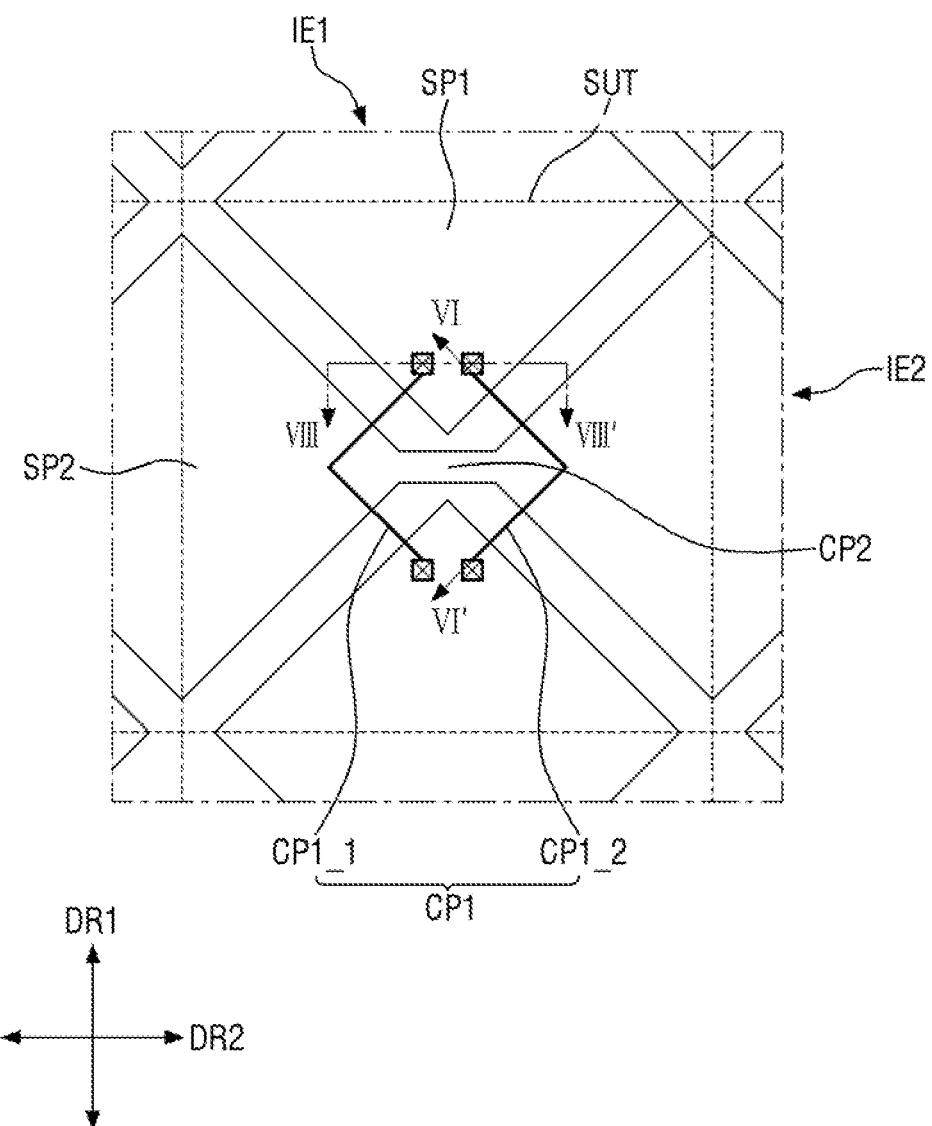
FIG. 5 is a partial enlarged view illustrating the touch area of FIG. 4.

FIG. 5 is a partial enlarged view illustrating the touch area of FIG. 4.

Referring to FIGS. 4 and 5, at least some of the first sensor units SP1 and the second sensor units SP2 may have a rhombic shape. Some of the first sensor units SP1 and the second sensor units SP2 may have a shape truncated from the rhombic shape. For example, all of the first sensor units SP1 and the second sensor units SP2 except for both ends in the extending direction may have a rhombic shape, and the first sensor units SP1 and the second sensor units SP2 located at both ends in the extending direction may have a triangular shape in which the rhombus shape is cut in half. The rhombic first sensor units SP1 and the rhombic second sensor units SP2 may have substantially the same size and shape as each other. The triangular first sensor units SP1 and the triangular second sensor units SP2 may have substantially the same size and shape as each other. However, the present invention is not limited thereto, and the shapes and sizes of the first sensor units SP and the second sensor units SP2 may be variously modified.

The first connection unit CP1 may connect the rhombic or triangular edges of the adjacent first sensor units SP1. The second connection unit CP2 may connect the rhombic or triangular edges of the adjacent second sensor units SP2. The widths of the first connection unit CP1 and the second connection unit CP2 may be smaller than the widths of the first sensor unit SP1 and the second sensor unit SP2, respectively.

The first sensing electrode IE1 and the second sensing electrode IE2 may cross each other and may be insulated from each other. The first sensing electrode IE1 and the second sensing electrode IE2 may be insulated from each other by connecting through conductive layers located in different layers in areas crossing each other.

The crossing of the first sensing electrode IE1 and the second sensing electrode IE2 may be performed by the first connection unit CP1 and/or the second connection unit CP2. For insulation and crossing, at least one of the first connection unit CP1 and the second connection unit CP2 may be located on a different layer from the first sensing electrode IE1 and the second sensing electrode IE2.

For example, the first sensor unit SP1 of the first sensing electrode IE1 and the second sensor unit SP2 of the second sensing electrode IE2 may be made of conductive layers located on the same layer, and the first sensor unit SP1 and the second sensor unit SP2 themselves might not cross or overlap each other. The adjacent first sensor unit SP1 and second sensor unit SP2 may be physically spaced apart from each other.

The second connection unit CP2 is formed of the same conductive layer as the second sensor unit SP2 and may connect the adjacent second sensor unit SP2. The adjacent first sensor units SP1 of the first sensing electrode IE1 are physically spaced apart from each other based on an area where the second connection unit CP2 passes. The first connection unit CP1 connecting the first sensor units SP1 may be formed of a conductive layer different from the first sensor unit SP1 and may cross the area of the second sensing electrode IE2. The first connection unit CP1 may be electrically connected to each of the adjacent first sensor units SP1 through a contact.

The plurality of first connection units CP1 may be provided. For example, although the present invention is not necessarily limited thereto, the first connection unit CP1 may include one first connection part CP1_1 at least partially overlapping the second sensing electrode IE2 at the adjacent one side thereof and the other first connection part CP1_2 at least partially overlapping the second sensing electrode IE2 at the adjacent the other side thereof. When the plurality of first connection units CP1 connecting the two adjacent first sensor units SP1 are provided, the disconnection of the first sensing electrode IE1 can be prevented even if any one of them is disconnected by static electricity or the like.

The first sensor units SP1 and the second sensor units SP2, adjacent to each other, may constitute a unit sensing area SUT. For example, with respect to the area where first sensing electrode IE1 and the second sensing electrode IE2 crossing each other, half of the two adjacent first sensor units SP1 and half of the two adjacent second sensor units SP2 may constitute a square or a rectangle. The area defined by the half areas of the two adjacent first sensor units SP1 and the two adjacent second sensor units SP2 may be one unit sensing area SUT. The plurality of unit sensing areas SUT may be arranged in a matrix.

In each of the unit sensing areas SUT, the capacitance value between the adjacent first sensor unit SP1 and second sensor unit SP2 may be used to determine whether or not an input touch has occurred and may also be used to calculate the corresponding position as touch input coordinates. The touch detection may be performed by a mutual cap method, but the present invention is not limited thereto.

Each of the unit sensing areas SUT may be larger than the size of a pixel. For example, the unit sensing area SUT may correspond to a plurality of pixels. The length of one side of the unit sensing area SUT may be in a range of 4 to 5 mm, but the present invention is not limited thereto.

Referring to FIG. 4, a plurality of touch signal wirings are arranged in the non-display area NDA outside of the touch area.

The touch signal wirings extend from touch pad units TPA1 and TPA2 located in the sub region SR to the non-display area NDA of the main region MR through the bending region BR.

The plurality of touch signal wirings include a plurality of touch driving wirings TX and a plurality of touch sensing wirings RX. The plurality of touch signal wirings may further include touch ground wiring G and/or touch antistatic wirings ES.

The touch driving wiring TX is connected to the first sensing electrode IE1. In an exemplary embodiment of the present disclosure, a plurality of touch driving wirings may be connected to one first sensing electrode IE1. For example, the touch driving wiring TX includes first touch driving wirings TX1_1, TX2_1, TX3_1 and TX4_1 connected to the lower end of the first sensing electrode IE1, and second touch driving wirings TX1_2, TX2_2, TX3_2, and TX4_2 connected to the upper end of the first sensing electrode IE1. The first touch driving wirings TX1_1, TX2_1, TX3_1 and TX4_1 may extend from the touch signal wiring pad unit TPA1 to one side in the first direction DR1 to be connected to the lower end of the first sensing electrode IE1. The second touch driving wirings TX1_2, TX2_2, TX3_2 and TX4_2 may extend from the touch signal wiring pad unit TPA1 to one side of the first direction DR1 and bypass the left edge of the touch area to be connected to the upper end of the first sensing electrode IE1.

The touch sensing wiring RX is connected to the second sensing electrode IE2. In an exemplary embodiment of the present disclosure, one touch sensing wiring RX may be connected to one first sensing electrode IE2. Each of the touch sensing wirings RX1, RX2, RX3, RX4, RX5 and RX6 may extend from the touch signal wiring pad unit TPA2 to one side of the first direction DR1 and extend toward the right edge of the touch area to be connected to the right end of the second sensing electrode IE2.

A touch antistatic wiring ES may be disposed at the outermost portion of the touch signal wiring. In an exemplary embodiment of the present disclosure, the touch antistatic wiring ES may include a first touch antistatic wiring ES1, a second touch antistatic wiring ES2, a third touch antistatic wiring ES3, and a fourth touch antistatic wiring ES4. The first to fourth touch antistatic wirings ES may surround the touch area and the signal wirings in a ring shape.

The first touch antistatic wiring ES1 may cover the outside of the right touch signal wiring.

The second touch antistatic wiring ES2 may cover the inside of the right touch signal wiring.

The third touch antistatic wiring ES3 may cover the inside of the left touch signal wiring and the outside of the touch signal wiring extending from the lower side of the touch area to the second direction DR2.

The fourth touch antistatic wiring ES4 may cover the outside of the left touch signal wiring and the outside of the touch signal wiring extending from the upper side of the touch area to the second direction DR2.

The touch ground wiring G is disposed between the signal wirings. The touch ground wiring G may include a first touch ground wiring G1, a second touch ground wiring G2, a third touch ground wiring G3, a fourth touch ground wiring G4, and a fifth touch ground wiring G5.

The first touch ground wiring G1 may be disposed between the touch sensing wiring RX and the first touch antistatic wiring ES1.

The second touch ground wiring G2 may be disposed between the second touch antistatic wiring ES2 and the touch sensing wiring RX.

The third touch ground wiring G3 may be disposed between the first touch driving wiring TX_1 and the third touch antistatic wiring ES3.

The fourth touch ground wiring G4 may be disposed between the first touch driving wiring TX_1 and the second touch driving wiring TX_2.

The fifth touch ground wiring G5 may be disposed between the second touch driving wiring TX_2 and the fourth touch antistatic wiring ES4.

Figure 6:
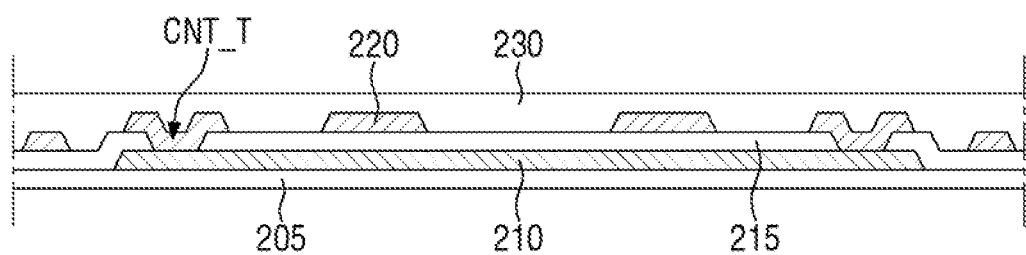
FIG. 6 is a cross-sectional view taken along the line VI-VI' in FIG. 5.
Figure 7:
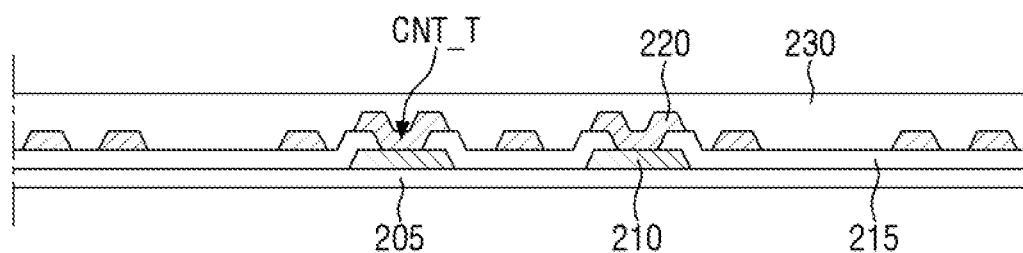
FIG. 7 is a cross-sectional view taken along the line VII-VII' in FIG. 5.

FIG. 6 is a cross-sectional view taken along the line VI-VI' in FIG. 5. FIG. 7 is a cross-sectional view taken along the line VII-VII' in FIG. 5.

Referring to FIGS. 5 to 7, the touch member may include a base layer 205, a first touch conductive layer 210 on the base layer 205, a first touch insulating layer 215 on the first touch conductive layer 210, a first touch insulating layer 215, a second touch conductive layer 220 on the first touch insulating layer 215, and a second touch insulating layer 230 covering the second touch conductive layer 220.

For example, the first touch conductive layer 210 is disposed on the base layer 205. The first touch conductive layer 210 is covered by the first touch insulating layer 215. The first touch insulating layer 215 insulates the first touch conductive layer 210 from the second touch conductive layer 220. The second touch conductive layer 220 is disposed on the first touch insulating layer 215. The second touch insulating layer 230 may cover and protect the second touch conductive layer 220.

The base layer 205 may include an inorganic insulating material. For example, the base layer 205 may include a silicon nitride layer, a silicon oxynitride layer, a silicon oxide layer, a titanium oxide layer, and/or an aluminum oxide layer.

The base layer 205 may be an inorganic film including a thin film encapsulation layer to be described later.

Each of the first touch conductive layer 210 and the second touch conductive layer 220 may include a metal or a transparent conductive material. Examples of the metal may include aluminum, titanium, copper, molybdenum, silver, and alloys thereof. Examples of the transparent conductive material may include transparent conducive oxides such as indium tin oxide (ITO), indium zinc oxide (IZO), zinc oxide (ZnO), and indium tin zinc oxide (ITZO), conductive polymers such as PEDOT, metal nanowires, and graphene.

The first touch conductive layer 210 and/or the second touch conductive layer 220 may be a multi-layered conductive layer. For example, the first touch conductive layer 210 and/or the second touch conductive layer 220 may have a three-layer structure of titanium/aluminum/titanium. As an example, the first touch conductive layer 210 and/or the second touch conductive layer 220 may include at least one metal layer and at least one transparent conductive layer.

In some exemplary embodiments of the present disclosure, the first touch conductive layer 210 and the second touch conductive layer 220 may include the same material. For example, both the first touch conductive layer 210 and the second touch conductive layer 220 may include aluminum. In an exemplary embodiment of the present disclosure, the first touch conductive layer 210 and the second touch conductive layer 220 may have a three-layer structure of titanium/aluminum/titanium.

In some exemplary embodiments of the present disclosure, the first touch conductive layer 210 and the second touch conductive layer 220 may include different materials. For example, the first touch conductive layer 210 may include a metal, and the second touch conductive layer 220 may include a transparent conductive material.

In an exemplary embodiment of the present disclosure, the first connection unit CP1 may be formed of the first touch conductive layer 210, and each of the first sensor unit SP1, the second sensor unit SP2, and the second connection unit CP2 may be formed of the second touch conductive layer 220. However, the present invention is not limited thereto, and the touch conductive layer including each member of the sensing electrode may be variously modified.

The first sensor unit SP1 of the first sensing electrode IE1 and the second sensor unit SP2 of the second sensing electrode IE2 may be formed in a planar pattern or a mesh pattern. When the first sensor unit SP1 and the second sensor unit SP2 are formed in a planar pattern, the second touch conductive layer 220 including the first sensor unit SP1 and the second sensor unit SP2 may be formed of a transparent conductive material. When the first sensor unit SP1 and the second sensor unit SP2 are formed in a mesh pattern, the second touch conductive layer 220 including the first sensor unit SP1 and the second sensor unit SP2 may be formed of an opaque material. Hereinafter, a case where the first sensor unit SP1 and the second sensor unit SP2 are respectively formed in a mesh pattern will be described as an example, but the present invention is not limited thereto.

The first touch insulating layer 215 and the second touch insulating layer 230 may each include an inorganic material or an organic material. In an exemplary embodiment of the present disclosure, any one of the first touch insulating layer 215 and the second touch insulating layer 230 may include an inorganic material, and the other thereof may include an organic material. In an exemplary embodiment of the present disclosure, the first touch insulating layer 215 may include a silicon nitride layer, a silicon oxynitride layer, a silicon oxide layer, a titanium oxide layer, or an aluminum oxide layer, and the second touch insulating layer 230 may include at least one of an acrylic resin, a methacrylic resin, polyisoprene, a vinyl resin, an epoxy resin, a urethane resin, a cellulose resin, a siloxane resin, and a polyimide resin.

The first touch insulating layer 215 may include a contact hole CNT_T. The first touch conductive layer 210 (for example, the first connection unit CP1) may be electrically connected to a part of the second touch conductive layer 220 (for example, the first sensor unit SP1) through the contact hole CNT_T.

When the first sensor unit SP1 and the second sensor unit SP2 are respectively formed in a mesh pattern, the second touch conductive layer 220 including the first sensor unit SP1 and the second sensor unit SP2 may be disposed on the non-light-emitting area of the display panel. When the second touch conductive layer 220 is disposed on the non-light-emitting area, even if an opaque low-resistance metal is applied to the second touch conductive layer 220, the second touch conductive layer 220 might not interfere with the light emission and might not be seen by a user.

Figure 8:
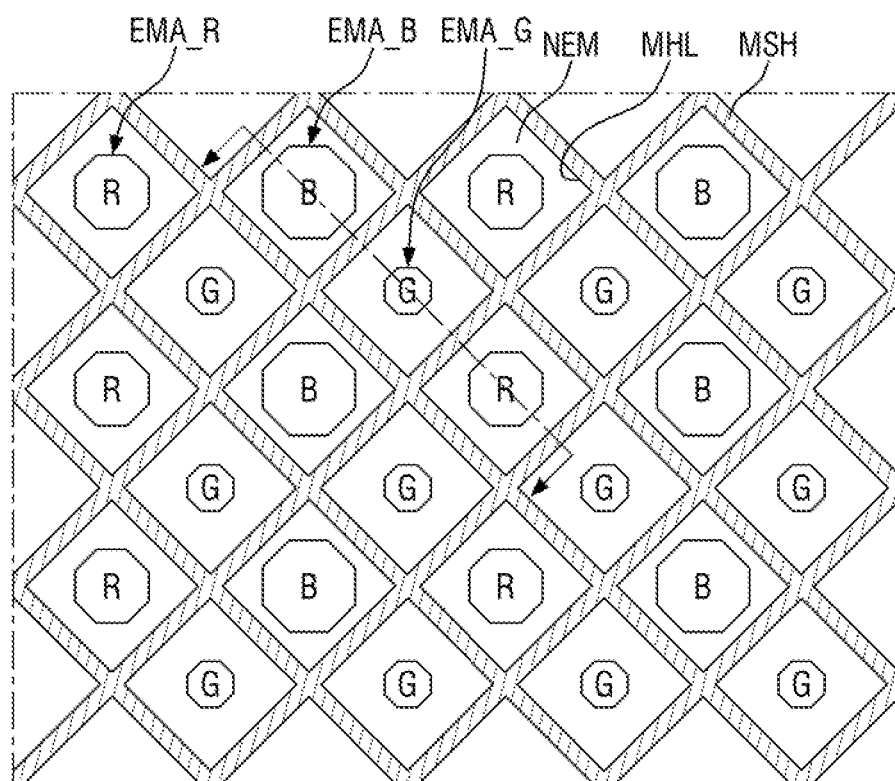
FIG. 8 is a layout diagram showing a relative arrangement of pixels of a display area and mesh patterns of a touch member according to an exemplary embodiment of the present disclosure.

FIG. 8 is a layout diagram showing a relative arrangement of pixels of a display area and mesh patterns of a touch member according to an exemplary embodiment of the present disclosure.

Referring to FIG. 8, the display area includes a plurality of pixels. Each pixel includes a light emitting area EMA. A non-light emitting area NEM is disposed between the light emitting areas EMA of the respective pixels. The mesh pattern MSH is disposed in the non-light-emitting area NEM.

The pixels may include a first color pixel, a second color pixel, and a third color pixel. The respective color pixels may be arranged in various ways. In an exemplary embodiment of the present disclosure, in the first row, first color pixels (for example, red pixels) and second color pixels (for example, blue pixels) may be alternately arranged along the second direction DR2. In the second row adjacent thereto, third color pixels (for example, green pixels) may be arranged along the second direction DR2. The pixels belonging to the second row may be staggered in the second direction DR2 with respect to the pixels belonging to the first row. The number of the third color pixels belonging to the second row may be twice the number of the first color pixels or second color pixel belonging to the first row. The arrangements of the first row and the second row may be repeated along the second direction DR2.

The size of the light emitting area EMA in each color pixel may be different. For example, the light emitting area EMA_B in the second color pixel may be larger than the light emitting area EMA_R in the first color pixel, and the light emitting area EMA_G in the third color pixel may be smaller than the light emitting area EMA_R in the first color pixel.

The shape of the light emitting area EMA of each color pixel may be substantially octagonal. However, the present invention is not limited thereto, and each light emitting area EMA may have a circular shape, a rhombic shape, a polygonal shape, or a polygonal shape having rounded corners.

The mesh pattern MSH may be disposed along the boundary of the pixels in the non-emission areas NEM. The mesh pattern MSH might not overlap the light emitting area EMA. The width of the mesh pattern MSH may be smaller than the width of the non-light-emitting area NEM. In an exemplary embodiment of the present disclosure, mesh holes MHL through which the mesh pattern MSH is exposed may have a substantially rhombic shape. The sizes of the respective mesh holes MHL may be the same as each other, but may be different from each other depending on the sizes of the light emitting areas EMA exposed through the mesh hole, or may be different from each other regardless of the sizes of the light emitting areas EMA. Although it is shown in the drawing that one mesh hole MHL corresponds to one light emitting area EMA, the present invention is not limited thereto, and one mesh hole MHL may correspond to two or more light emitting areas EMA.

Figure 9:
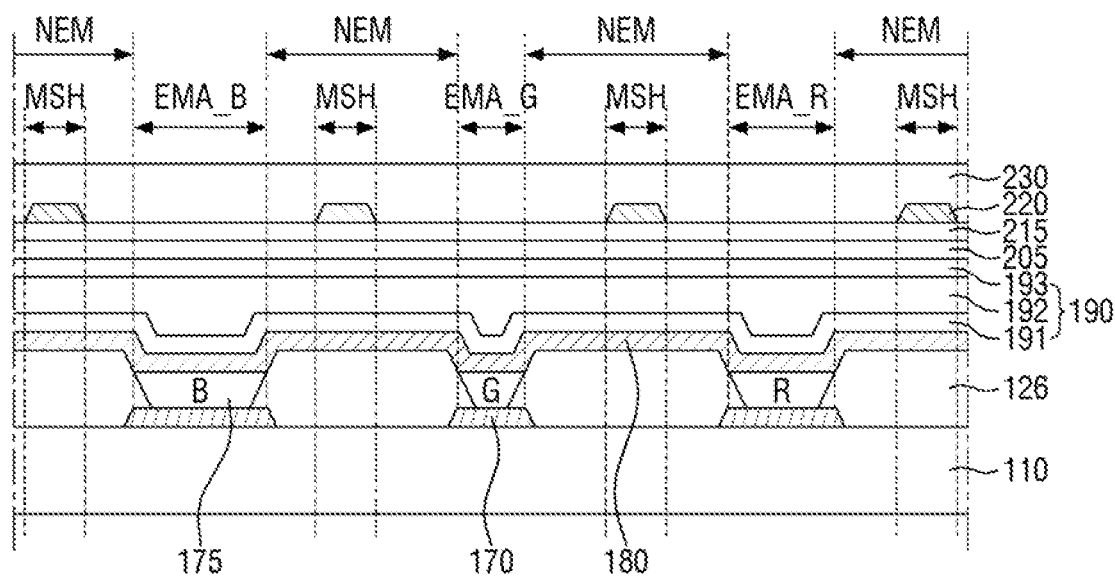
FIG. 9 is a cross-sectional view taken along the line IX-IX' in FIG. 8.

FIG. 9 is a cross-sectional view taken along the line IX-IX' in FIG. 8. In the cross-sectional view of FIG. 9, most layers under an anode electrode are omitted, and a structure above an organic light emitting element is mainly illustrated.

Referring to FIG. 9, an anode electrode 170 is disposed on a substrate 110 for each pixel. A bank layer 126 exposing the anode electrode 170 may be disposed on the anode electrode 170. The bank layer 126 is disposed in the non-light-emitting area NEM.

An organic layer 175 may be disposed on the anode electrode 170 exposed by the bank layer 126, and a cathode electrode 180 may be disposed on the organic layer 175. The cathode electrode 180 may be disposed over the entire organic layer 175 and may be continuous across all of the pixels. The anode electrode 170, the organic layer 175, and the cathode electrode 180 may together constitute an organic light emitting element.

A thin film encapsulation layer 190 including a first inorganic film 191, an organic film 192, and a second inorganic film 193 may be disposed on the cathode electrode 180. The base layer 205, first touch insulating layer 215, second touch conductive layer 220, and second touch insulating layer 230 of the touch member may be sequentially disposed on the thin film encapsulation layer 190. Since FIG. 9 is a cross-sectional view illustrating the sensor unit, the first touch conductive layer 210 is not shown in the corresponding cross-sectional view.

The second touch conductive layer 220 may at least partially overlap the bank layer 126, and may be disposed in the non-light-emitting areas NEM. Since the second touch conductive layer 220 constitutes a mesh pattern MSH of the sensor unit and does not overlap the light emitting areas EMA, it might not interfere with light emission and might not be seen by a user.

Hereinafter, the pixel of the display device will be described.

Figure 10:
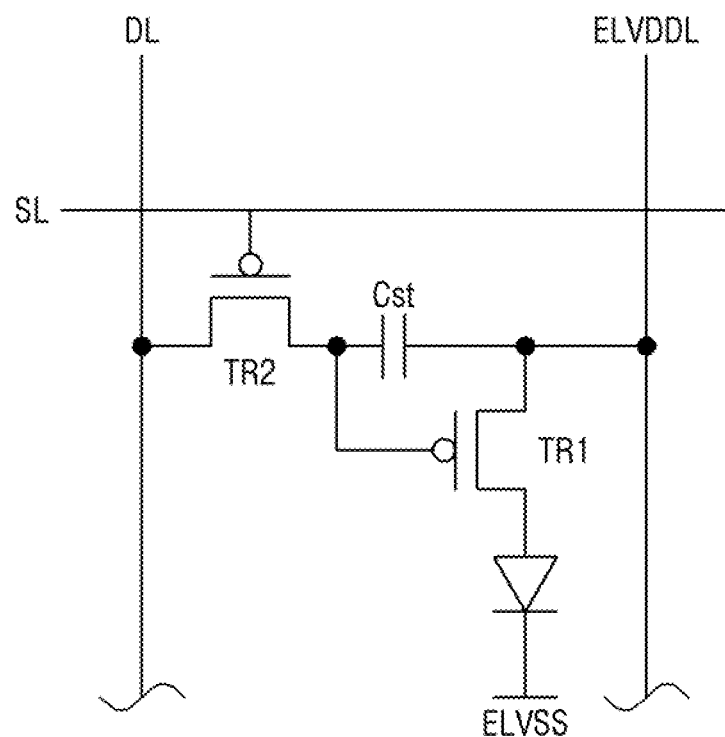
FIG. 10 is a circuit diagram of a pixel of a display device according to an exemplary embodiment of the present disclosure.

FIG. 10 is a circuit diagram of a pixel of a display device according to an exemplary embodiment of the present disclosure.

Referring to FIG. 10, a pixel circuit may include a first transistor TR1, a second transistor TR2, a capacitor Cst, and an organic light emitting diode (OLED).

The first transistor TR1 may be a driving transistor, and the second transistor TR2 may be a switching transistor. Although it is shown in the drawing that both the first transistor TR1 and the second transistor TR2 are PMOS transistors, any one of the first transistor TR1 and the second transistor TR2 may be a NMOS transistor. For example, both of the first and second transistors TR1 and TR2 may be NMOS transistors.

A first electrode (source electrode) of the first transistor TR1 is connected to a first power supply wiring ELVDDL and a second electrode (drain electrode) thereof is connected to the anode electrode of the organic light emitting diode (OLED). A first electrode (source electrode) of the second transistor TR2 is connected to a data line DL, and a second electrode (drain electrode) thereof is connected to a gate electrode of the first transistor TR1. The cathode electrode of the organic light emitting diode (OLED) receives a second power supply voltage ELVSS. The second power supply voltage ELVSS may be lower than a first power supply voltage ELVDD received from the first power supply wiring ELVDDL.

The second transistor TR2 may output a data signal applied to a data line DL in response to a scan signal applied to a scan line SL. The capacitor Cst may charge a voltage corresponding to the data signal received from the second transistor TR2. The first transistor IR1 may control a driving current flowing through the organic light emitting diode (OLED) in accordance with the amount of charge stored in the capacitor Cst.

The equivalent circuit of FIG. 10 illustrates an exemplary embodiment of the present invention, and the pixel circuit may include a greater number (for example 7) of transistors and capacitors.

Figure 11:
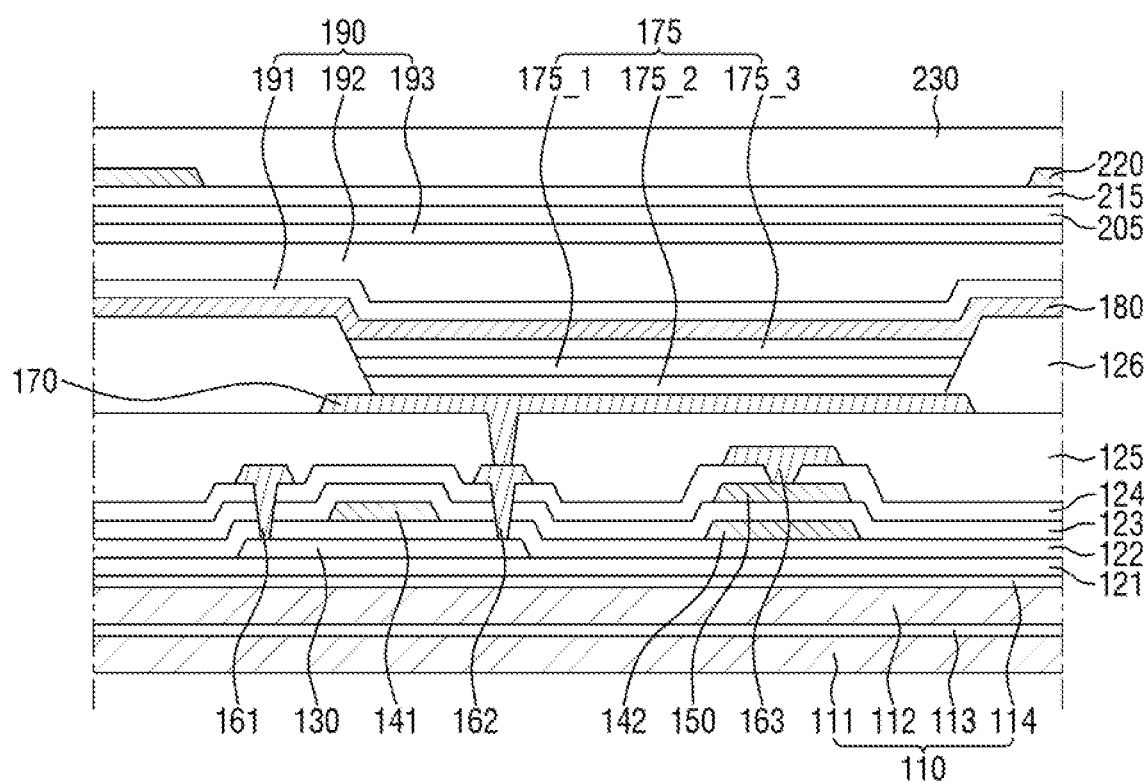
FIG. 11 is a cross-sectional view illustrating a pixel of a display area of a display device according to an exemplary embodiment of the present disclosure.

FIG. 11 is a cross-sectional view illustrating a pixel of a display area of a display device according to an exemplary embodiment of the present disclosure. The cross-sectional structure of the display device will be described in detail with reference to FIG. 11.

Referring to FIG. 11, the display device includes a substrate 110. The substrate 110 supports respective layers disposed thereon. The substrate 110 may be made of an insulating material such as a polymer resin. Examples of the polymer resin may include polyether sulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), and combinations thereof.

In an exemplary embodiment of the present disclosure, the substrate 110 may include a plurality of sub-substrates 111 and 112. For example, the substrate 110 may include a first sub-substrate 111 and a second sub-substrate 112, which are laminated to each other in a thickness direction. Each of the first sub-substrate 111 and the second sub-substrate 112 may be a flexible substrate made of polyimide or the like. The substrate 110 may further include a first barrier layer 113 disposed between the first sub-substrate 111 and the second sub-substrate 112, and a second barrier layer 114 disposed on the second sub-substrate 112. Each of the first barrier layer 113 and the second barrier layer 114 may include silicon nitride, silicon oxide, and/or silicon oxynitride.

A buffer layer 121 is disposed on the substrate 110. The buffer layer 121 may be disposed on the second barrier layer 114. The buffer layer 121 may include silicon nitride, silicon oxide, and/or silicon oxynitride.

A semiconductor layer 130 is disposed on the buffer layer 121. The semiconductor layer 130 forms a channel of the thin film transistor of the pixel. The semiconductor layer 130 may include polycrystalline silicon. In an exemplary embodiment of the present disclosure, the semiconductor layer 130 may include monocrystalline silicon, low-temperature polycrystalline silicon, amorphous silicon, or an oxide semiconductor. Example of the oxide semiconductor may include a binary compound ABx, a ternary compound AbxCy and a quaternary compound AbxCyDz, each which selectively contains indium (In), zinc (Zn), gallium (Ga), tin (Sn), titanium (Ti), aluminum (Al), hafnium (Hf), zirconium (Zr), and/or magnesium (Mg). In an exemplary embodiment of the present disclosure, the semiconductor layer 130 may include ITZO (an oxide including indium, tin, and titanium) or IGZO (an oxide including indium, gallium, and tin).

A first insulating layer 122 is disposed on the semiconductor layer 130. The first insulating layer 122 may be a gate insulating film having a gate insulating function. The first insulating layer 122 may include a silicon compound, a metal oxide, or the like. For example, the first insulating layer 122 may include silicon oxide, silicon nitride, silicon oxynitride, aluminum oxide, tantalum oxide, hafnium oxide, zirconium oxide, titanium oxide, and the like. These oxides may be used alone or in combination with each other. The first insulating layer 122 may be a single-layer film or a multi-layer film including a laminate film of different materials.

A first gate conductive layer 140 is disposed on the first insulating layer 122. The first gate conductive layer 140 may include a gate electrode 141 of the thin film transistor, a scan line connected to the gate electrode 141, and a first electrode 142 of a capacitor.

The first gate conductive layer 140 may include molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (ra), tungsten (W), and/or copper (Cu).

A second insulating layer 123 may be disposed on the first gate conductive layer 140. The second insulating layer 123 may be an interlayer insulating film. The second insulating layer 123 may include an inorganic insulating material such as silicon oxide, silicon nitride, silicon oxynitride, hafnium oxide, aluminum oxide, titanium oxide, tantalum oxide, and/or zinc oxide.

A second gate conductive layer 150 is disposed on the second insulating layer 123. The second gate conductive layer 150 may include a second electrode of a storage capacitor. The second gate conductive layer 150, similar to the first gate conductive layer 140, may include molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and/or copper (Cu). The second gate conductive layer 150 may be formed of the same material as the first gate conductive layer 140, but the present invention is not limited thereto. The second gate conductive layer 150 may be a single-layer film or a multi-layer film.

A third insulating layer 124 is disposed on the second gate conductive layer 150. The third insulating layer 124 may be an interlayer insulating film. The third insulating layer 124 may include an inorganic insulating material such as silicon oxide, silicon nitride, silicon oxynitride, hafnium oxide, aluminum oxide, titanium oxide, tantalum oxide, or zinc oxide, or an organic insulating material such as polyacrylate resin, epoxy resin, phenolic resin, polyamide resin, polyimide resin, unsaturated polyester resin, polyphenylene ether resin, polyphenylene sulfide resin, or benzocyclobutene (BCB). The third insulating layer 124 may be a single-layer film or a multi-layer film including a laminate film of different materials.

A data conductive layer 160 is disposed on the third insulating layer 124. The data conductive layer 160 may include a first electrode 161, a second electrode 162, and a first power source wiring 163 of the thin film transistor. The first electrode 161 and second electrode 162 of the thin film transistor may be electrically connected to the source region and drain region of the semiconductor layer 130 through a contact hole penetrating the third insulating layer 124, the second insulating layer 123, and the first insulating layer 122. The first power source wiring 163 of the thin film transistor may be electrically connected to the second electrode 150 of the storage capacitor through a contact hole penetrating the third insulating layer.

The data conductive layer 160 may include molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and/or copper (Cu). The data conductive layer 160 may be a single-layer film or a multi-layer film. For example, the data conductive layer 160 may have a laminate structure of Ti/Al/Ti, Mo/Al/Mo, Mo/AlGe/Mo, or Ti/Cu.

A fourth insulating layer 125 is disposed on the data conductive layer 160. The fourth insulating layer 125 covers the data conductive layer 160. The fourth insulating layer 125 may be a via layer. The fourth insulating layer 125 may include an organic insulating material such as polyacrylate resin, epoxy resin, phenolic resin, polyamide resin, polyimide resin, unsaturated polyester resin, polyphenylene ether resin, polyphenylene sulfide resin, or benzocyclobutene (BCB).

An anode electrode 170 is disposed on the fourth insulating layer 125. The anode electrode 170 may be connected to the second electrode 162 of the thin film transistor through a contact hole penetrating the fourth insulating layer 125.

The anode electrode 170 may have, but is not limited to having, a laminate film structure in which a material layer having a high work function, including inditum tin oxide (ITO), indium zinc oxide (IZO), zinc oxide (ZnO), or indium oxide ($In_2O_3$) and a reflective material layer including silver (Ag), magnesium (Mg), aluminum (Al), platinum (Pt), lead (Pd), gold (Au), nickel (Ni), neodymium (Nd), iridium (Ir), lithium (Li), calcium (Ca), or a mixture thereof are laminated. The material layer having a high work function may be disposed above the reflective material layer, and may thus be disposed closer to the organic layer. The anode electrode 170 may have a multi-layer structure of ITO/Mg, ITO/MgF, ITO/Ag, or ITO/Ag/ITO. As understood herein, the term "high work function" may be understood to include the range of work functions of the aforementioned materials that are offered as examples of materials having a high work function.

A bank layer 126 may be disposed on the anode electrode 170. The bank layer 126 may include an opening exposing the anode electrode. The bank layer 126 may include an organic insulating material such as polyacrylate resin, epoxy resin, phenolic resin, polyamide resin, polyimide resin, unsaturated polyester resin, polyphenylene ether resin, polyphenylene sulfide resin, and/or benzocyclobutene (BCB). The bank layer 126 may include an inorganic material.

An organic layer 175 is disposed in the opening of the bank layer 126. The organic layer 175 may include an organic light emitting layer 175_1, a hole injecting/transporting layer 175_2, and an electron injecting/transporting layer 175_3. Although it is shown in the drawing that each of the hole injecting/transporting layer 1752 and the electron injecting/transporting layer 175_3 is formed as a single layer, a plurality of injecting layers and a plurality of transporting layers may be laminated to each other.

A cathode electrode 180 is disposed on the organic layer 175 and the bank layer 126. The cathode electrode 180 may be disposed over the entire display area. The cathode electrode 180 may include a material layer having a low work function, including Li, Ca, LiF/Ca, LiF/Al, Al, Mg, Ag, Pt, Pd, Ni, Au, Nd, Ir, Cr, BaF, Ba, or a compound or mixture thereof (for example, a mixture of Ag and Mg). The cathode electrode 180 may further include a transparent metal oxide layer disposed on the material layer having a low work function. As used herein, the term "low work function" may be understood to include the range of work functions of the aforementioned materials that are offered as examples of materials having a low work function.

The thin film encapsulation layer 190 is disposed on the cathode electrode 180. The thin film encapsulation layer 190 may include a first inorganic film 191, an organic film 192, and a second inorganic film 193. Each of the first inorganic film 191 and the second inorganic film 193 may include silicon nitride, silicon oxide, silicon oxynitride, or the like. The organic film 192 may include an organic insulating material such as polyacrylate resin, epoxy resin, phenolic resin, polyamide resin, polyimide resin, unsaturated polyester resin, polyphenylene ether resin, polyphenylene sulfide resin, and/or benzocyclobutene (BCB).

A touch member is disposed on the thin film encapsulation layer 190. Since the laminate structure of the touch member has been described above, a redundant description will be omitted.

Hereinafter, signal wirings around the bending region BR of the display device will be described in detail.

Figure 12:
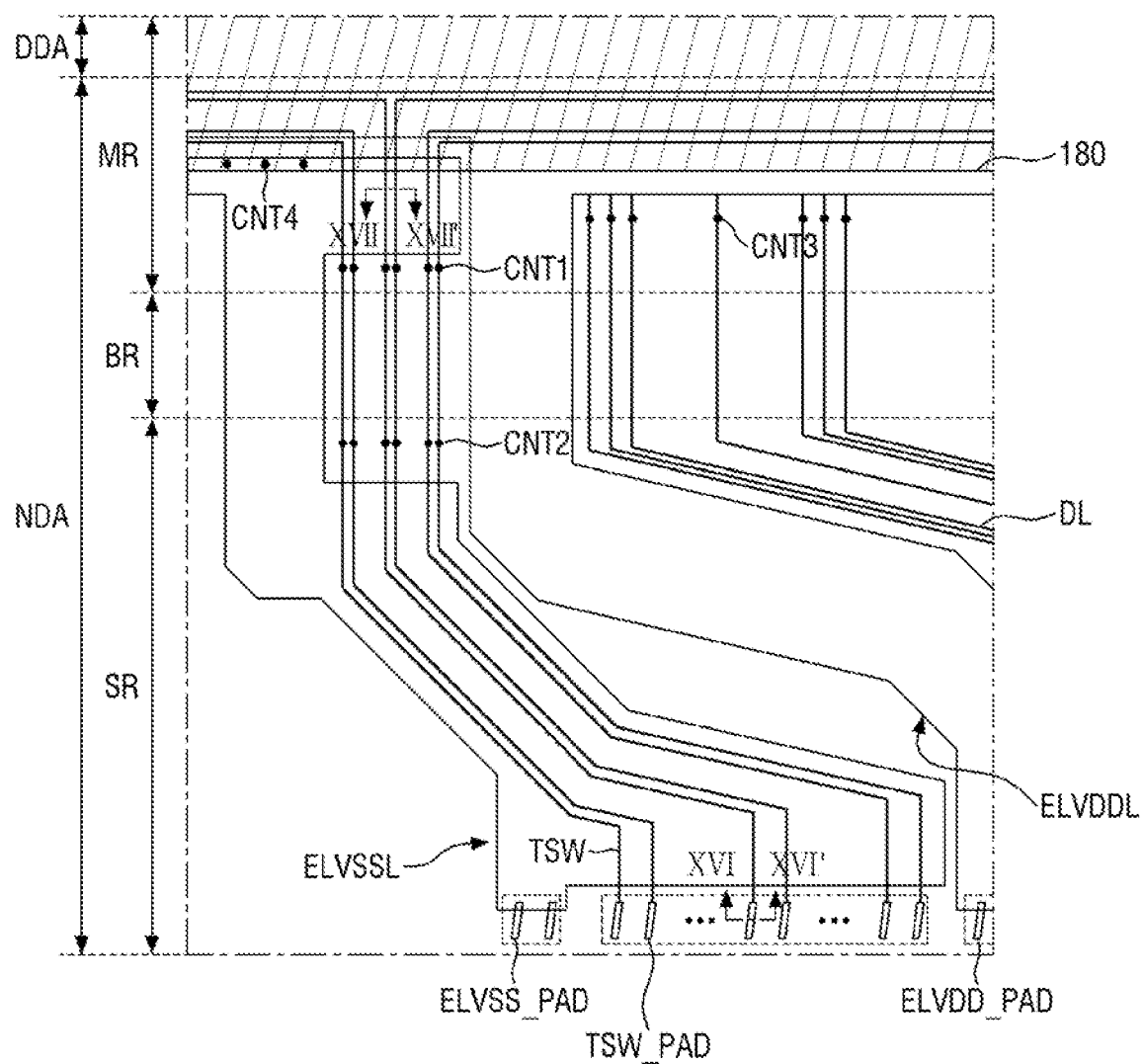
FIG. 12 is a partial plan view illustrating a non-display area of a display device according to an exemplary embodiment of the present disclosure.

FIG. 12 is a partial plan view illustrating a non-display area of a display device according to an exemplary embodiment of the present disclosure.

Referring to FIG. 12, the touch signal wiring TSW may be disposed adjacent to the first power supply wiring ELVDDL and the second power supply wiring ELVSSL. The data line DL may be adjacent to the first power supply wiring ELVDDL. In an exemplary embodiment of the present disclosure, the respective signal wirings in the sub region SR may be arranged along the second direction DR2 in order of the second power supply wiring ELVSSL, the touch signal wiring TSW, the first power supply wiring ELVDDL, and the data line DL. The touch signal wiring TSW may be disposed between the first power supply wiring ELVDDL and the second power supply wiring ELVSSL.

The pad unit PAD includes a touch signal wiring pad unit TSW_PAD, a first power supply wiring pad unit ELVDDL_PAD, and a second power supply wiring pad unit ELVSSL_PAD. The touch signal wiring pad unit TSW_PAD may be disposed between the first power supply wiring pad unit ELVDDL_PAD and the second power supply wiring pad unit ELVSSL_PAD. A data wiring pad unit may be disposed at one side of the first power supply wiring pad unit ELVDDL_PAD in the second direction DR.

The first power supply wiring ELVDDL and the second power supply wiring ELVSSL may respectively extend from the first power supply wiring pad unit ELVDDL_PAD and the second power supply wiring pad unit ELVSSL_PAD toward the direction of the main region MR. The first power supply wiring ELVDDL and the second power supply wiring ELVSSL may be formed of the same conductive layer, for example, a data conductive layer. The first power supply wiring ELVDDL and the second power supply wiring ELVSSL may extend over the sub region SR, the bending region BR, and the main region MR by using the data conductive layer. Since the first power supply wiring ELVDDL and the second power supply wiring ELVSSL are formed of the same conductive layer, they may be spaced apart from each other.

Figure 13:
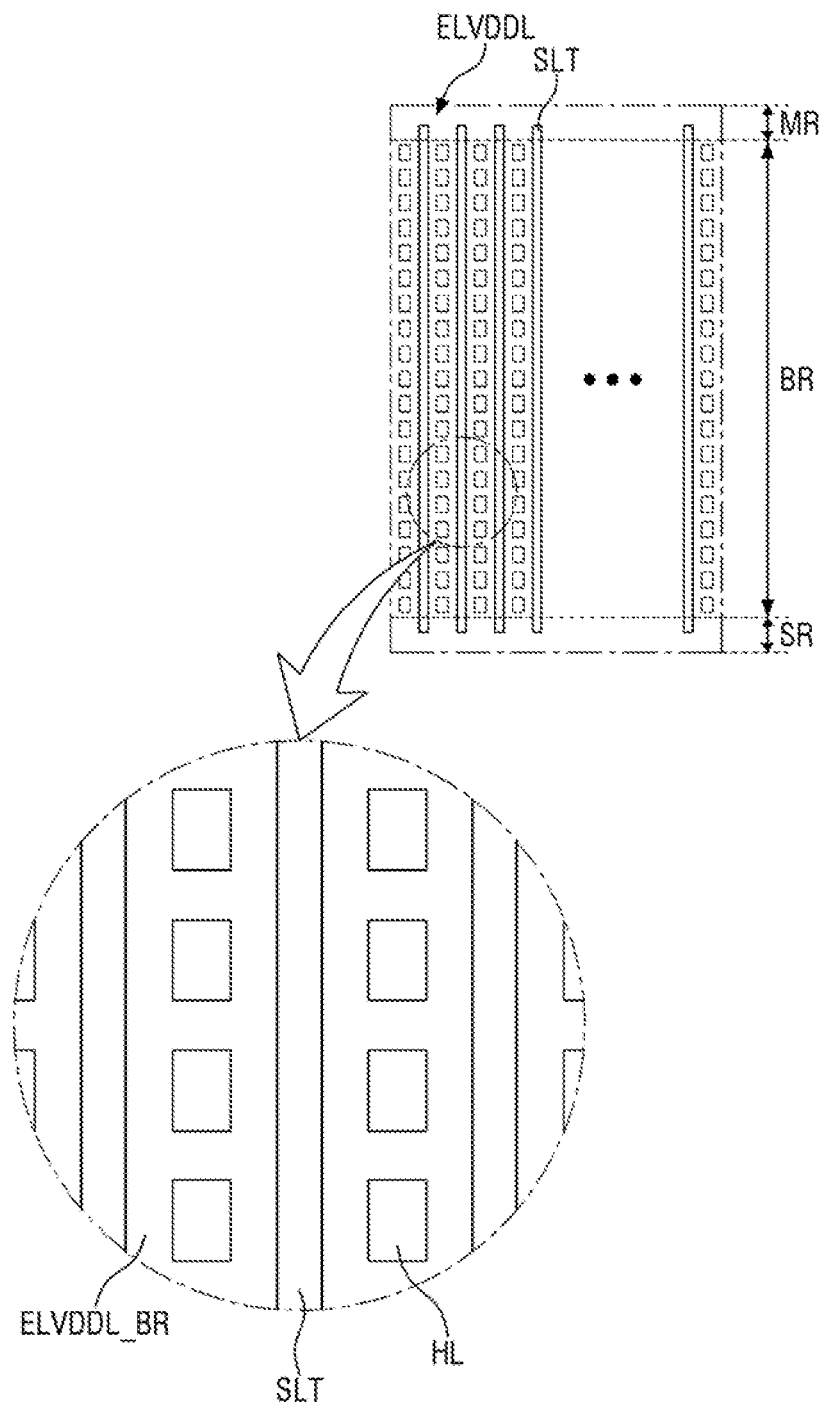
FIG. 13 is a layout diagram of a first power supply wiring in the vicinity of a bending region.

FIG. 13 is a diagram illustrating a first power supply wiring in the vicinity of a bending region. Referring to FIG. 13, the first power supply wiring ELVDDL in the bending region BR may include slits SLT and holes HL. Although the first power supply wiring ELVDDL takes a planar wiring form in both the main region MR and the sub region SR, the first power supply wiring ELVDDL may be divided by the slits SLT in the bending region. The portions divided by the slits SLT have a shape similar to that of a plurality of linear signal wirings. When the planar wiring is divided into linear patterns in the bending region BR, bending stress can be alleviated. Further, when the first power supply wiring ELVDDL has a shape similar to that of the touch signal wiring TSW and the data line DL, stress unbalance can be alleviated.

The first power supply wiring ELVDDL_BR in the bending region BR may include a plurality of holes HL in the linear patterns divided by the slit SLT. As the holes HL are formed in the linear patterns, the stress relaxation function of the first power supply wiring ELVDDL can be doubled. Further, the holes HL divide the linear pattern into one side and the other side (e.g., a first side and a second side). In this case, even when one side of the linear pattern is short circuited, signals may be transmitted through the other side thereof, so that the short circuit of the first power supply wiring ELVDDL or a rapid increase of resistance can be prevented.

In the second power supply wiring ELVSSL, which is the same planar wiring as the first power supply wiring ELVDDL, the second power supply wiring ELVSSL may also include slits SLT and hole HL.

Referring again to FIG. 12, each of the first power supply line ELVDDL and the second power supply line ELVSSL may extend from the sub region SR to the vicinity of the display area DDA of the main region MR through the bending region BR. The first power supply wiring ELVDDL may extend to one side and the other side in the second direction DR2 near the display area DDA. The second power supply wiring ELVSSL may extend along one side in the second direction DR2 while being spaced apart from the first power supply wiring ELVDDL in the vicinity of a portion where the first power supply wiring ELVDDL extends in the second direction DR2. The second power supply wiring ELVSSL may extend along the left edge of the non-display area NDA.

The cathode electrode 180 disposed in the display area DDA may partially protrude from the non-display are NDA and may at least partially overlap the second power supply wiring ELVSSL. In an area where the second power supply wiring ELVSSL and the cathode electrode 180 at least partially overlap each other, the second power supply wiring ELVSSL and the cathode electrode 180 may be in contact with each other through a fourth contact hole CNT4. In an exemplary embodiment of the present disclosure, the contact of the second power supply wiring ELVSSL and the cathode electrode 180 may be mediated by the anode conductive layer located on the same layer as the anode electrode.

The data line DL may extend in parallel with the first power supply wiring ELVDDL. The data line DL may be formed of a data conductive layer. The data line DL extends from the pad unit toward the display area DDA via the bending region BR, and may transfer to another conductive layer through a third contact hole CNT3 at a portion crossing the extending portion of the first power supply wring ELVDDL in the second direction DR2. For example, the data line DL may transfer to the first gate conductive layer, the second gate conductive layer or the anode conductive layer to the first power supply wring ELVDDL, and may transfer to the data conductive layer using a contact hole immediately before reaching the display area DDA (touch area).

The touch signal wiring TSW extends from the touch signal wiring pad unit TSW_PAD toward the main region MR. In the main region MR, the touch signal wiring TSW may be bent and extended in the second direction DR2 right before entering the non-display area NDA, for example, at the boundary between the display area DDA and the non-display area NDA.

Although the touch signal wiring TSW includes a touch conductive layer in the sub region SR and the main region MR, the touch signal wiring TSW may include a data conductive layer, which is the same layer as the first power supply wiring ELVDDL and the second power supply wiring ELVSSL, in the bending region BR.

Figure 14:
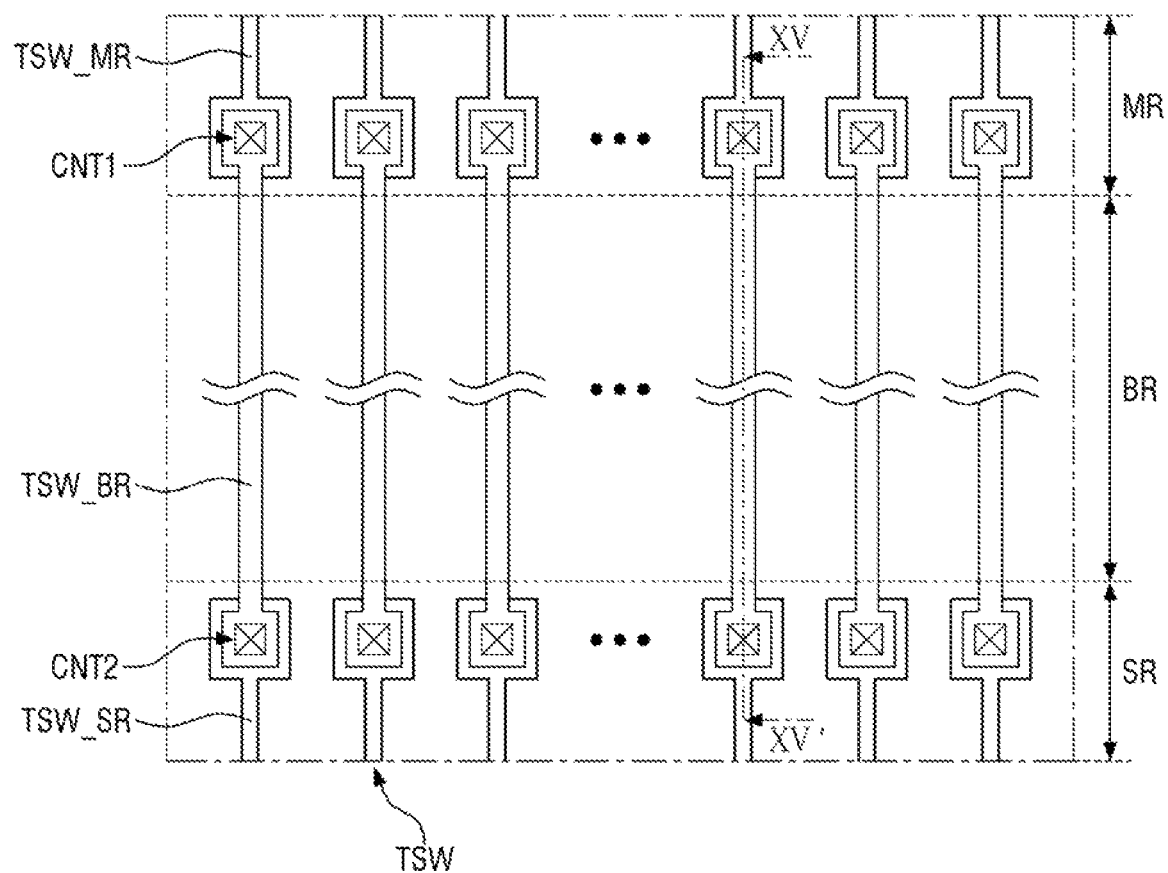
FIG. 14 is a layout diagram of touch signal wirings in the vicinity of the bending region.
Figure 15:
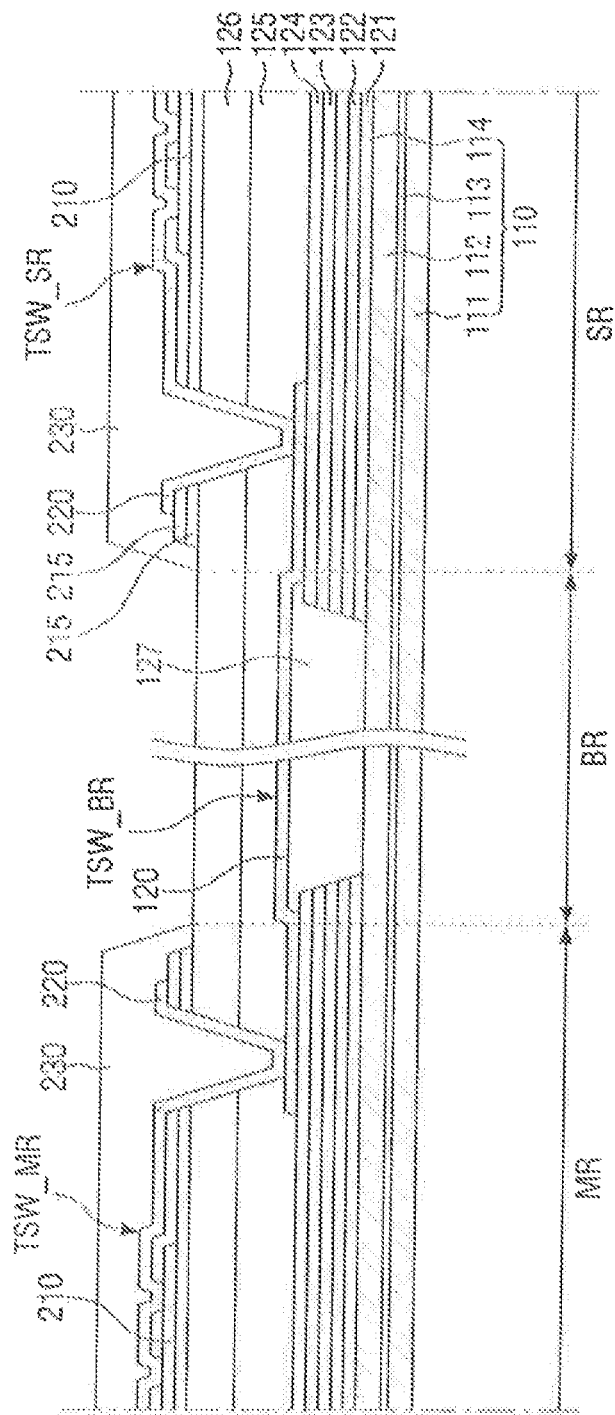
FIG. 15 is a cross-sectional view taken along the line XV-XV' in FIG. 14.

FIG. 14 is a layout diagram of touch signal wirings in the vicinity of the bending region. FIG. 15 is a cross-sectional view taken along the line XV-XV' in FIG. 14.

Referring to FIGS. 14 and 15, the touch signal wiring TSW includes the first touch conductive layer 210 and the second touch conductive layer 220 in the sub region SR and the main region MR, respectively. The first touch conductive layer 210 and the second touch conductive layer 220 may have substantially the same planar pattern shape and may at least partially overlap each other. The first touch conductive layer 210 and the second touch conductive layer 220 may be electrically connected to each other through the contact holes CNT1 and CNT2 penetrating the first touch insulating layer 215.

The bending region BR may include an opening and a bending insulating layer 127 disposed therein. The opening may expose the surface of the second sub-substrate 112 by sequentially removing underlying insulating material layers. The bending insulating layer 127 may fill the opening. The bending insulating layer 127 may include an organic insulating material such as polyacrylate resin, epoxy resin, phenolic resin, polyamide resin, polyimide resin, unsaturated polyester resin, polyphenylene ether resin, polyphenylene sulfide resin, or benzocyclobutene (BCB).

The touch signal wiring TSW extends through the data conductive layer 160 in the bending area BR. For example, although the touch signal wiring TSW in the main region MR and the touch signal wiring TSW in the sub region SR are formed of a touch conductive layer, the touch signal wiring TSW in the vicinity of the bending region BR is formed of the data conductive layer 160.

For example, in a portion adjacent to the bending region BR in the main region MR, the base layer 205 may be disposed on the bank layer 126 with the thin film encapsulation layer removed. The touch signal wiring TSW includes a second touch conductive layer 220 electrically connected to the first touch conductive layer 210 on the base layer 205 through the first contact hole CNT1. The second touch conductive layer 220 further extends from the end of the first touch conductive layer 210 toward the bending region BR to at least partially overlap the underlying data conductive layer 160. The second touch conductive layer 220 is electrically connected to the data conductive layer 160 through the first contact hole CNT 1. A second touch insulating layer 230 is disposed on the second touch conductive layer 220.

The sub region SR may have substantially the same laminate structure as the main region MR. For example, the second touch conductive layer 220 in the sub region SR further extends from the end of the first touch conductive layer 210 toward the bending region BR to at least partially overlap the underlying data conductive layer 160, and is electrically connected to the data conductive layer 160 through the second contact hole CNT2.

Meanwhile, in the bending region, the data conductive layer 160 is disposed on the bending insulating layer 127. A fourth insulating layer 125 and a bank layer 126, which are made of an organic material, may be disposed on the data conductive layer 160. The first and second touch conductive layers 210 and 220 might not be disposed on the bank layer 126 in the bending region BR. In the bending region BR, other layers included within the touch member may be omitted.

In the main region MR and the sub region SR, the touch signal wiring TSW includes the second touch conductive layer 220 and/or the first touch conductive layer 210, but, in the bending region BR, the touch signal wiring TSW, similarly to other signal wirings, may include the data conductive layer 160. Therefore, a uniform bending connection structure can be realized over the entire bending region BR.

Figure 16:
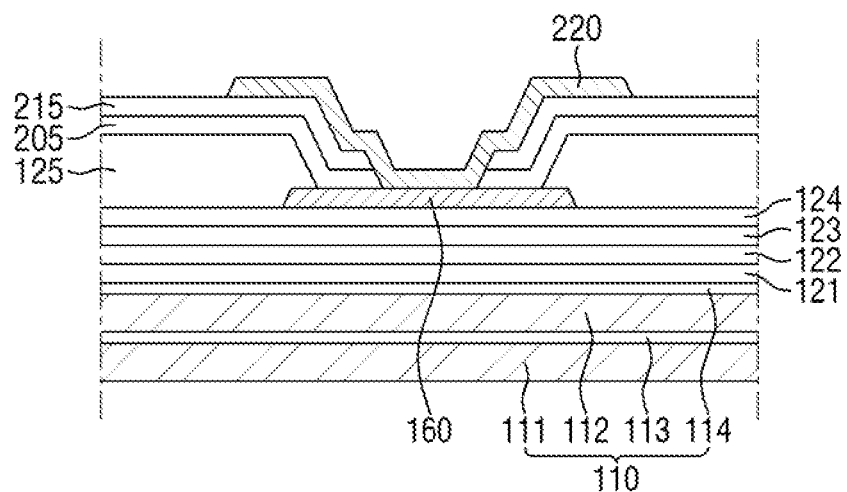
FIG. 16 is a cross-sectional view taken along the line XVI-XVI' in FIG. 12.

FIG. 16 is a cross-sectional view taken along the line XVI-XVI' in FIG. 12.

Referring to FIG. 16, in the vicinity of the touch signal wiring pad unit TSW_PAD, the second touch conductive layer 220 is connected to the data conductive layer 160 through a contact. In the touch signal wiring pad unit TSW_PAD, the second touch insulating layer 230 is removed, and thus the second touch conductive layer 220 is exposed. The bump of the driving substrate may be attached onto the exposed second touch conductive layer 220. In the vicinity of the touch signal wiring pad unit TSW_PAD, the bank layer may be omitted.

The pad units PAD of other signal wirings (the first power supply wiring ELVDDL, the second power supply wiring ELVSSL, and the data line DL) may have the same structure as the touch signal wiring pad unit TSW_PAD. For example, although the first power supply wiring ELVDDL extends to the data conductive layer 160 in the sub region SR, the first power supply wiring ELVDDL reaches the touch signal wiring pad unit TSW_PAD, and the second touch conductive layer 220 connected by a contact is formed on the touch signal wiring pad unit TSW_PAD, thereby having a cross-sectional structure shown in FIG. 16. As the pad units have the same laminate structure, the attachment of the driving substrate can be made easier.

Figure 17:
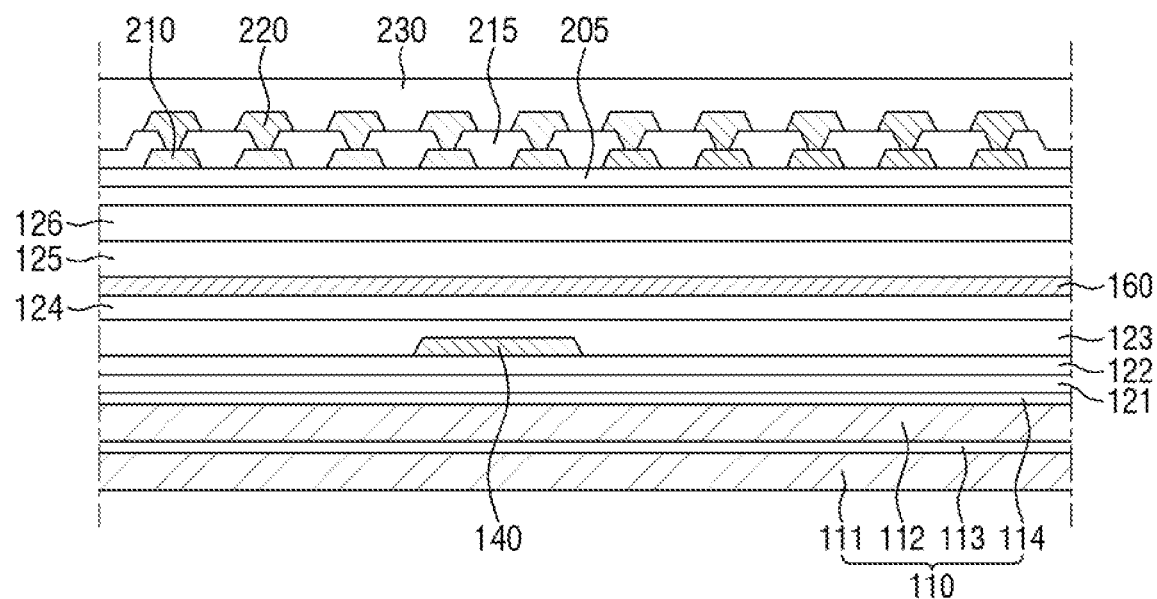
FIG. 17 is a cross-sectional view taken along the line XVII-XVII' in FIG. 12.
Figure 18:
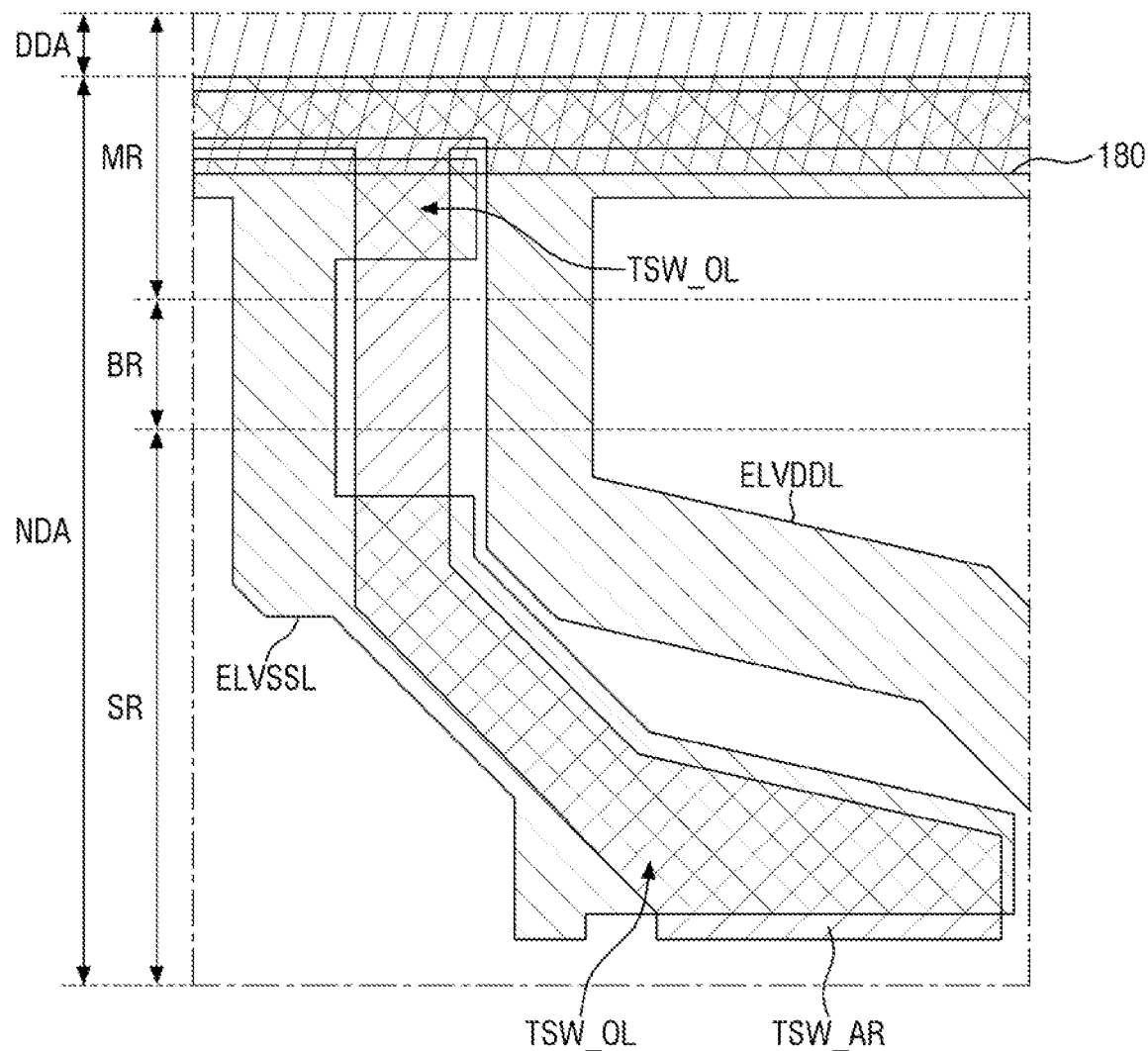
FIG. 18 is a schematic view showing the relationship of the main signal wirings in FIG. 12.

FIG. 17 is a cross-sectional view taken along the line XVII-XVII' in FIG. 12. FIG. 18 is a schematic view showing the relationship of the main signal wirings in FIG. 12.

Referring to FIGS. 12, 17 and 18, when the touch signal wiring TSW overlaps another wiring, noise may occur. For example, when the touch signal wiring TSW overlaps another signal wiring having various voltages and transmitting fluctuating signals with an insulating layer therebetween, these signal wirings may be inductively coupled to each other with an insulating film therebetween, and thus touch information flowing through the touch signal wiring TSW may be distorted.

When the touch signal line TSW enters the main region MR and proceeds to the display area DDA, the touch signal line TSW overlaps the cathode electrode 180. Since a constant second power supply voltage ELVSS is applied to the cathode electrode 180, when the touch signal wiring TSW overlaps the cathode electrode 180 and the cathode electrode 180 covers the touch signal wiring TSW, even if there is another signal wiring thereunder, the noise due to the another signal wiring can be blocked.

The touch signal wiring TSW between the end of the cathode electrode 180 and the pad unit PAD overlaps the second power supply wiring ELVSSL transmitting the constant second power supply voltage ELVSS, thereby blocking the noise due to another signal. For example, as shown in FIG. 18, in the sub region SR, the second power supply wiring ELVSSL includes not only an area extending in parallel with a touch signal wiring area TSW_AR but also an area TSW_OL overlapping the touch signal wiring area TSW_AR. Further, in the main region MR, the second power supply wiring ELVSSL includes not only an area extending in parallel with a touch signal wiring area TSW_AR but also an area TSW_OL protruding toward the touch signal wiring area TSW_AR and overlapping the touch signal wiring area TSW_AR. In the area TSW_OL overlapping the touch signal wiring area TSW_AR, the second power supply wiring ELVSSL covers a plurality of touch signal wirings TSW. In an exemplary embodiment of the present disclosure, the second power supply wiring ELVSSL may include a portion having a larger width than the bending region BR in the main region MR or the sub region SR.

In the area TSW_OL where the touch signal wiring TSW and the second power supply wiring ELVSSL overlap each other, the second power supply wiring ELVSSL is formed of the data conductive layer 160, and the touch signal wiring TSW is formed of the first and second touch conductive layers 210 and 220, so that a short does not occur even when the touch signal wiring TSW and the second power supply wiring ELVSSL overlap each other. In the overlapping area, as shown in FIG. 17, even when another signal wiring formed of the first gate conductive layer 140 is disposed under the touch signal wiring TSW to overlap the touch signal wiring TSW, the second power supply wiring ELVSSL for providing a constant second power supply voltage ELVSS is interposed therebetween, so that the influence on the touch signal wiring TSW can be blocked.

Meanwhile, since the touch signal wiring TSW in the bending region BR, the area where the first contact hole CNT1 and the second contact hole CNT2 of the touch signal wiring TSW are formed, and the touch signal wiring pad unit TSW_PAD includes the data conductive layer 160, they do not overlap the second power supply wiring ELVSSL in the corresponding areas. However, since these areas are areas where other noise signal wirings are not interposed thereunder, the noise received by the touch signal wiring TSW can be prevented.

Figure 19:
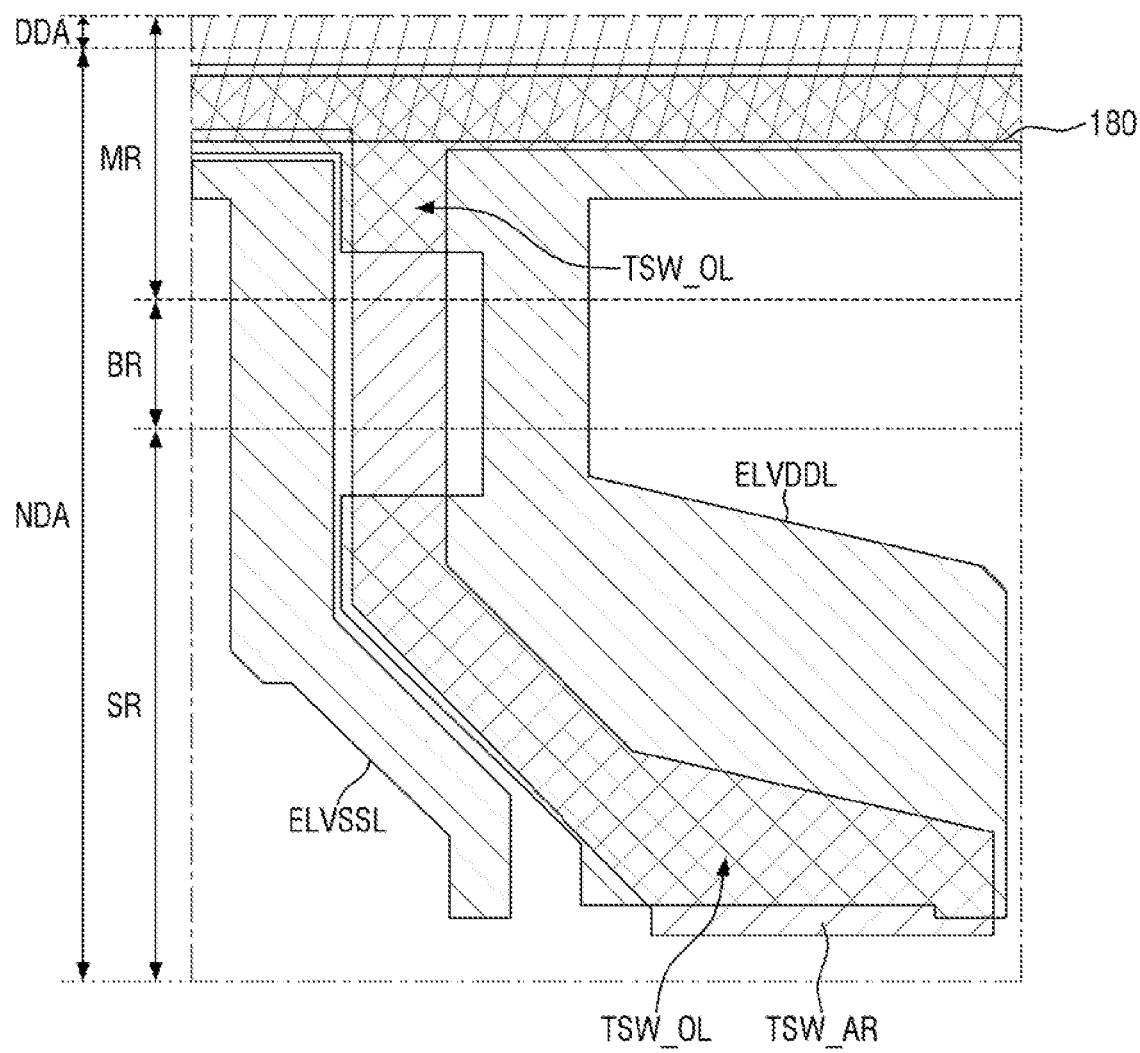
FIG. 19 is a schematic view showing the relationship of main signal wirings of a non-display area of a display device according to an exemplary embodiment of the present disclosure.

FIG. 19 is a schematic view showing the relationship of main signal wirings of a non-display area of a display device according to an exemplary embodiment of the present disclosure.

Referring to FIG. 19, this structure is different from the structure illustrated in FIG. 18 in that instead of the second power supply wiring ELVSSL, the first power supply wiring ELVDDL extends leftward to at least partially overlap the touch signal line TSW (TSW_OL). Since the first power supply wiring ELVDDL also transmits a constant first power supply voltage ELVDD, in a manner similar to the case of FIG. 18, the noise received by the touch signal wiring TSW can be blocked.

FIG. 19 illustrates a case where the end of the cathode electrode 180 in the first direction DR1 does not overlap the second power supply wiring ELVSSL. When the width by which the cathode electrode 180 protrudes from the display area DDA is reduced in order to reduce the bezel of the display device, the cathode electrode 180 might not overlap the second power supply wiring ELVSSL. When a portion extending in the second direction DR2 of the first power supply wiring ELVDDL is disposed between the second power supply wiring ELVSSL and the cathode electrode 180, noise blocking can be achieved even if the touch signal wiring TSW is disposed in a space between the first power supply wiring ELVDDL and the end of the cathode electrode 180. Thus, in the main region MR, it is possible to sufficiently secure a space for disposing the noise-blocked touch signal wiring TSW extending in the second direction DR2 immediately before reaching the display area DDA.

Figure 20:
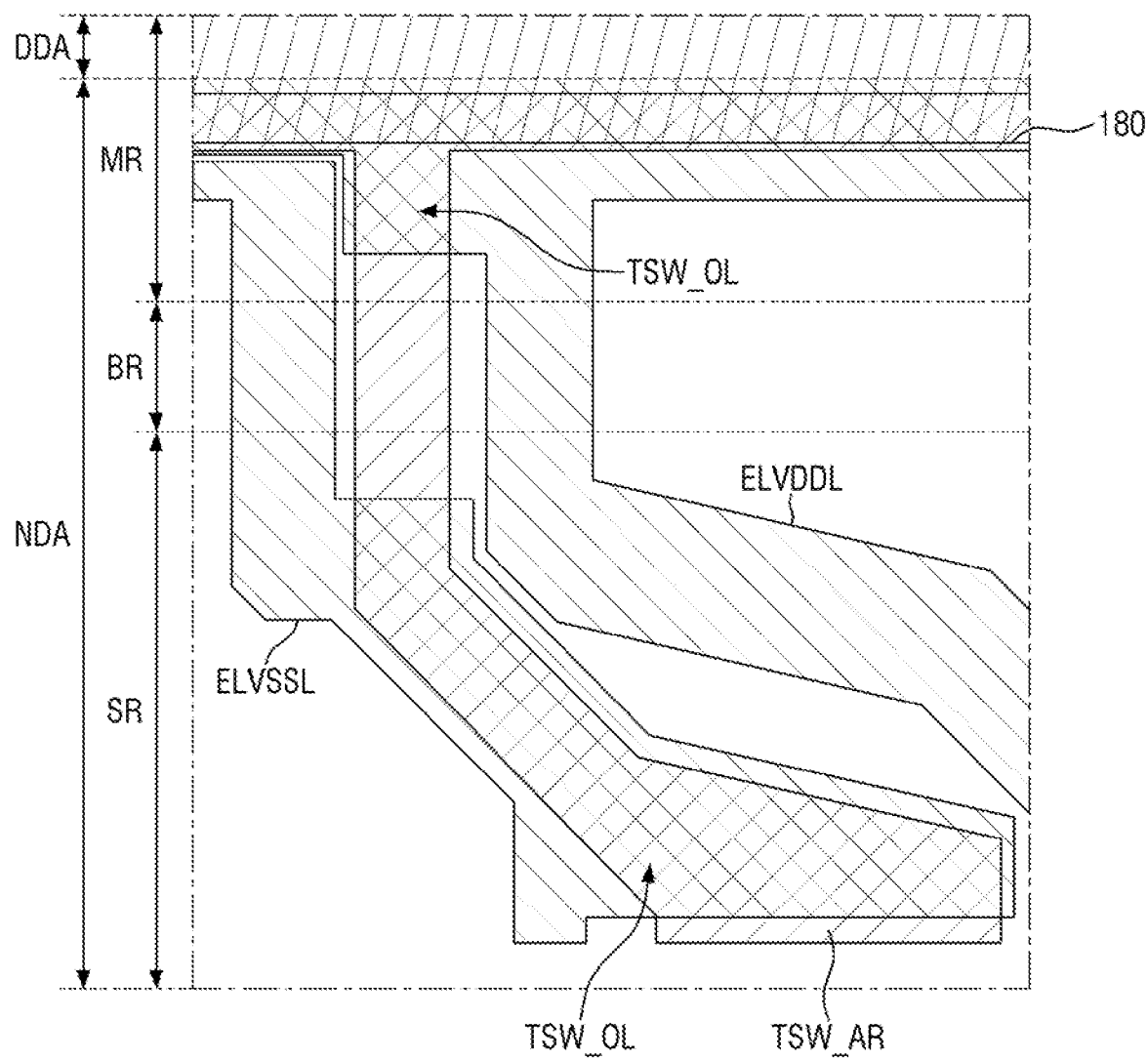
FIG. 20 is a schematic view showing the relationship of main signal wirings of a non-display area of a display device according to an exemplary embodiment of the present disclosure.

FIG. 20 is a schematic view showing the relationship of main signal wirings of a non-display area of a display device according to an exemplary embodiment of the present disclosure.

Referring to FIG. 20, this structure is different from the aforementioned structure in that in the sub region SR, noise is blocked by extending the width of the second power supply wiring ELVSSL to at least partially overlap the touch signal wiring TSW, whereas in the main region, noise is blocked by extending the width of the first power supply wiring ELVDDL to at least partially overlap the touch signal wiring TSW.

Contrary to the example shown, in the sub region, the first power supply wiring ELVDDL may extend to at least partially overlap the touch signal line TSW, and in the main region, the second power supply wiring ELVSSL may extend to at least partially overlap the touch signal line TSW.

As described above, according to the display device of an exemplary embodiment of the present disclosure of the present invention, touch signal wirings overlap voltage wirings to be blocked, and thus signal noises can be reduced.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A display device, comprising:
   a first region including a display area;
   a second region including a pad unit;
   a bending region disposed between the first region and the second region; and
   a plurality of signal wirings extending from the second region to the first region and crossing through the bending region,
   wherein the plurality of signal wirings includes a plurality of touch signal wirings and a first power supply wiring,
   wherein the plurality of touch signal wirings at least partially overlap the first power supply wiring in the first region, and
   wherein the plurality of touch signal wirings at least partially overlaps the first power supply wiring in the second region.

2. The display device of claim 1, wherein, in the bending region, the plurality of touch signal wirings and the first power supply wiring are formed of a same conductive layer, and in both the first region and the second region, the plurality of touch signal wirings and the first power supply wiring are formed of different conductive layers.

3. The display device of claim 2, wherein, in the bending region, the plurality of touch signal wirings is formed of a first conductive layer, and in both the first region and the second region, the plurality of touch signal wirings is formed of a second conductive layer electrically connected to the first conductive layer through a contact hole.

4. The display device of claim 3, wherein the first power supply wiring is formed of the first conductive layer in the first region, the second region, and the bending region.

5. The display device of claim 3, further comprising:
   a third conductive layer disposed to at least partially overlap an area where the first power supply wiring and the plurality of touch signal wirings overlap each other,
   wherein the first power supply wiring is disposed between the plurality of touch signal wirings and the third conductive layer.

6. The display device of claim 1, wherein the first power supply wiring includes a portion having a larger width than that of the bending region in the first region.

7. The display device of claim 1, wherein the plurality of signal wirings further includes a second power supply wiring.

8. The display device of claim 7, wherein the first power supply wiring and the second power supply wiring are formed of a same conductive layer, and are spaced apart from each other.

9. The display device of claim 8, wherein the plurality of touch signal wirings is disposed between the first power supply wiring and the second power supply wiring.

10. The display device of claim 8, wherein the plurality of touch signal wirings at least partially overlaps the second power supply wiring in the second region.

11. The display device of claim 10, wherein the second power supply wiring includes a portion having a larger width than that of the bending region in the second region.

12. A display device, comprises:
a substrate including: a first region including a display area; a second region including a pad unit; a bending region disposed between the first region and the second region; and a plurality of signal wirings extending from the second region to the first region, and crossing the bending region;
a gate conductive layer disposed on the substrate;
a first insulating layer disposed on the gate conductive layer;
a data conductive layer disposed on the first insulating layer;
a second insulating layer disposed on the data conductive layer; and
a touch conductive layer disposed on the second insulating layer,
wherein the plurality of signal wirings includes a plurality of touch signal wirings and a first power supply wiring,
wherein the first power supply wiring includes the data conductive layer,
wherein each of the plurality of touch signal wirings includes the touch conductive layer in the first region and the second region, and further includes the data conductive layer in the bending region, and
wherein the plurality of touch signal wirings at least partially overlaps the first power supply wiring in the first region.

13. The display device of claim 12, wherein the first power supply wiring includes a portion having a larger width than that of the bending region in the first region.

14. The display device of claim 12, wherein the plurality of touch signal wirings at least partially overlaps the first power supply wiring in the second region.

15. The display device of claim 12, wherein the plurality of signal wirings further includes a second power supply wiring.

16. The display device of claim 15, wherein the second power supply wiring includes the data conductive layer.

17. The display device of claim 16, wherein the plurality of touch signal wirings is disposed between the first power supply wiring and the second power supply wiring.

18. The display device of claim 16, wherein the plurality of touch signal wirings at least partially overlaps the second power supply wiring in the second region.

19. A display device, comprising:
a substrate including: a first region including a display area having a touch area defined therein; a second region including a pad unit; a bending region disposed between the first region and the second region; and a plurality of signal wirings extending from the second region to the first region, and crossing the bending region;
a gate conductive layer disposed on the substrate;
a first insulating layer disposed on the gate conductive layer,
a data conductive layer disposed on the first insulating layer;
a second insulating layer disposed on the data conductive layer; an anode electrode disposed on the second insulating layer;
a bank layer including an opening exposing the anode electrode;
a light emitting layer disposed within the opening of the bank layer on the anode electrode;
a cathode electrode disposed on the light emitting layer;
an encapsulation layer disposed on the cathode electrode;
a first touch conductive layer disposed on the encapsulation layer;
a first touch insulating layer disposed on the first touch conductive layer; and
a second touch conductive layer disposed on the first touch insulating layer,
wherein the plurality of signal wirings includes a plurality of touch signal wirings and a first power supply wiring,
wherein the first power supply wiring includes the data conductive layer,
wherein each of the touch signal wirings includes the first touch conductive layer and the second touch conductive layer in the first region, and the second region and further includes the data conductive layer in the bending region, and
wherein the plurality of touch signal wirings at least partially overlap the first power supply wiring in the first region.

20. The display device of claim 19, further comprising:
a plurality of first sensing electrodes and a plurality of second sensing electrodes disposed in the display area,
wherein each of the plurality of first sensing electrodes includes a plurality of first sensor units arranged in a first direction and a first connection unit connecting the adjacent first sensor units, and
wherein each of the plurality of second sensing electrodes includes a plurality of second sensor units arranged in a second direction crossing the first direction and a second connection unit connecting the adjacent second sensor units.

21. The display device of claim 20, wherein the first connection unit is formed of the first touch conductive layer, and each of the first sensor unit, the second sensor unit, and the second connection unit is formed of the second touch conductive layer.

22. The display device of claim 20, wherein the first sensor unit and the second sensor unit each include a mesh pattern.

23. The display device of claim 22, wherein the mesh pattern at least partially overlaps the bank layer.

24. The display device of claim 23, wherein each of the first touch conductive layer and the second touch conductive layer includes an opaque metal.

25. The display device of claim 19, wherein, in the second region, the plurality of touch signal wirings at least partially overlaps the first power source supply wiring.

26. The display device of claim 19, wherein each of the plurality of signal wirings includes the data conductive layer.

27. The display device of claim 26, wherein the plurality of touch signal wirings is disposed between the first power supply wiring and the second power supply wiring.

28. The display device of claim 27, wherein, in the second region, the plurality of touch signal wirings at least partially overlaps the second power supply wiring.

29. The display device of claim 19, further comprising: a base layer disposed between the encapsulation layer and the first touch conductive layer and including an inorganic material.

30. The display device of claim 19, further comprising: a second touch insulating layer disposed on the second touch conductive layer.

* * * * *